US012581168B2

(12) United States Patent
Hendry

(10) Patent No.: US 12,581,168 B2
(45) Date of Patent: Mar. 17, 2026

(54) METHOD FOR A MEDIA FILE GENERATING AND A METHOD FOR A MEDIA FILE PROCESSING

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 18/027,304

(22) PCT Filed: Sep. 23, 2021

(86) PCT No.: PCT/KR2021/012948
§ 371 (c)(1),
(2) Date: Mar. 20, 2023

(87) PCT Pub. No.: WO2022/065872
PCT Pub. Date: Mar. 31, 2022

(65) Prior Publication Data
US 2023/0362456 A1      Nov. 9, 2023

Related U.S. Application Data

(60) Provisional application No. 63/082,480, filed on Sep. 24, 2020.

(51) Int. Cl.
*H04N 19/119*      (2014.01)
*H04N 21/81*       (2011.01)

(52) U.S. Cl.
CPC ........... *H04N 21/81* (2013.01); *H04N 19/119* (2014.11)

(58) Field of Classification Search
None
See application file for complete search history.

(56) References Cited

U.S. PATENT DOCUMENTS

2020/0228837 A1      7/2020   Song et al.
2023/0015840 A1 *   1/2023   Sánchez De La Fuente ...............
                                        H04N 21/8451
2023/0027058 A1 *   1/2023   Hannuksela ........... H04N 19/33

FOREIGN PATENT DOCUMENTS

KR      10-2019-0117694 A      10/2019
KR      10-2019-0131077 A      11/2019
KR      10-2020-0085921 A      7/2020
KR      10-2020-0110415 A      9/2020

* cited by examiner

*Primary Examiner* — Joni Hsu
(74) *Attorney, Agent, or Firm* — Bryan Cave Leighton Paisner LLP

(57)      ABSTRACT

A media file generation method according to the present document comprises the steps of: configuring sub-picture tracks; configuring a base track referring to at least one sub-picture track; and generating a media file including the sub-picture tracks and the base track, wherein the sub-picture tracks include a first sub-picture track and one or more second sub-picture tracks, the first sub-picture track includes one or more slices, when the one or more slices are not all slices of a sub-picture, all slices of the first sub-picture track are included in the same sub-picture as the sub-picture, and the base track referring to the first sub-picture track also refers to the one or more second sub-picture tracks including the remaining slices of the same sub-picture.

14 Claims, 14 Drawing Sheets

METHOD FOR A MEDIA FILE GENERATING AND A METHOD FOR A MEDIA FILE PROCESSING

CROSS-REFERENCE TO RELATED APPLICATIONS

This application is the National Stage filing under 35 U.S.C. 371 of International Application No. PCT/KR2021/012948, filed on Sep. 23, 2021, which claims the benefit of U.S. Provisional Applications No. 63/082,480 filed on Sep. 24, 2020, the contents of which are all hereby incorporated by reference herein in their entirety.

BACKGROUND OF THE DISCLOSURE

Field of the Disclosure

The present disclosure relates to an image coding technology, and, most particularly, to a method for processing a media file for coded image information in an image coding system and a apparatus of the same.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as 360-degree video like virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

However, even if video information is compression processed, as described above, with the increase in requests for high-quality images, a size (or amount) of image information being processed is increasing, and the size of the compressed image information is expected to increase even more than the related art.

Therefore, in order to process high-resolution high-capacity video information, there lies an issue of how to define a video information file and a format of files including information for processing such video information file, so that media can be effectively processed.

SUMMARY OF THE DISCLOSURE

Technical Solutions

According to an embodiment of the present disclosure, provided herein is a method and apparatus for efficiently storing and delivering video/audio data.

According to an embodiment of the present disclosure, provided herein is a method and apparatus for configuring (or forming) a file format that can be used by supporting VVC.

According to an embodiment of the present disclosure, provided herein is a method and apparatus for forming a track for storing and delivering video/image data and for generating a media file.

According to an embodiment of the present disclosure, provided herein is a method and apparatus for preventing occurrence of a case where a subpicture track is allowed to include one or more complete slices but not all slices are included in one subpicture.

According to an embodiment of the present disclosure, provided herein is a method and apparatus for preventing occurrence of a problem in a case where a subpicture track includes slices but not all slices are included in one subpicture.

According to an embodiment of the present disclosure, provided herein is a method for generating a media file that is performed by a media file generating apparatus.

According to an embodiment of the present disclosure, provided herein is a media file generating apparatus generating a media file.

According to an embodiment of the present disclosure, provided herein is a method for processing a media file that is performed by a media file processing apparatus.

According to an embodiment of the present disclosure, provided herein is a media file processing apparatus processing a media file.

Effects of the Disclosure

According to an embodiment of the present disclosure, video/image data may be efficiently stored and delivered.

According to an embodiment of the present disclosure, a file format that can be used by supporting VVC may be configured (or formed).

According to an embodiment of the present disclosure, a track for storing and delivering video/image data may be formed, and a media file may be generated.

According to an embodiment of the present disclosure, a case where a subpicture track is allowed to include one or more complete slices but not all slices are included in one subpicture may be prevented from occurring.

According to an embodiment of the present disclosure, a case where a subpicture track includes slices but not all slices are included in one subpicture may be prevented from occurring.

According to an embodiment of the present disclosure, a relationship between a VVC subpicture track, a VVC subpicture, and slices within the VVC subpicture may become simple and clear.

DESCRIPTION OF EXEMPLARY EMBODIMENTS

Figure 1:
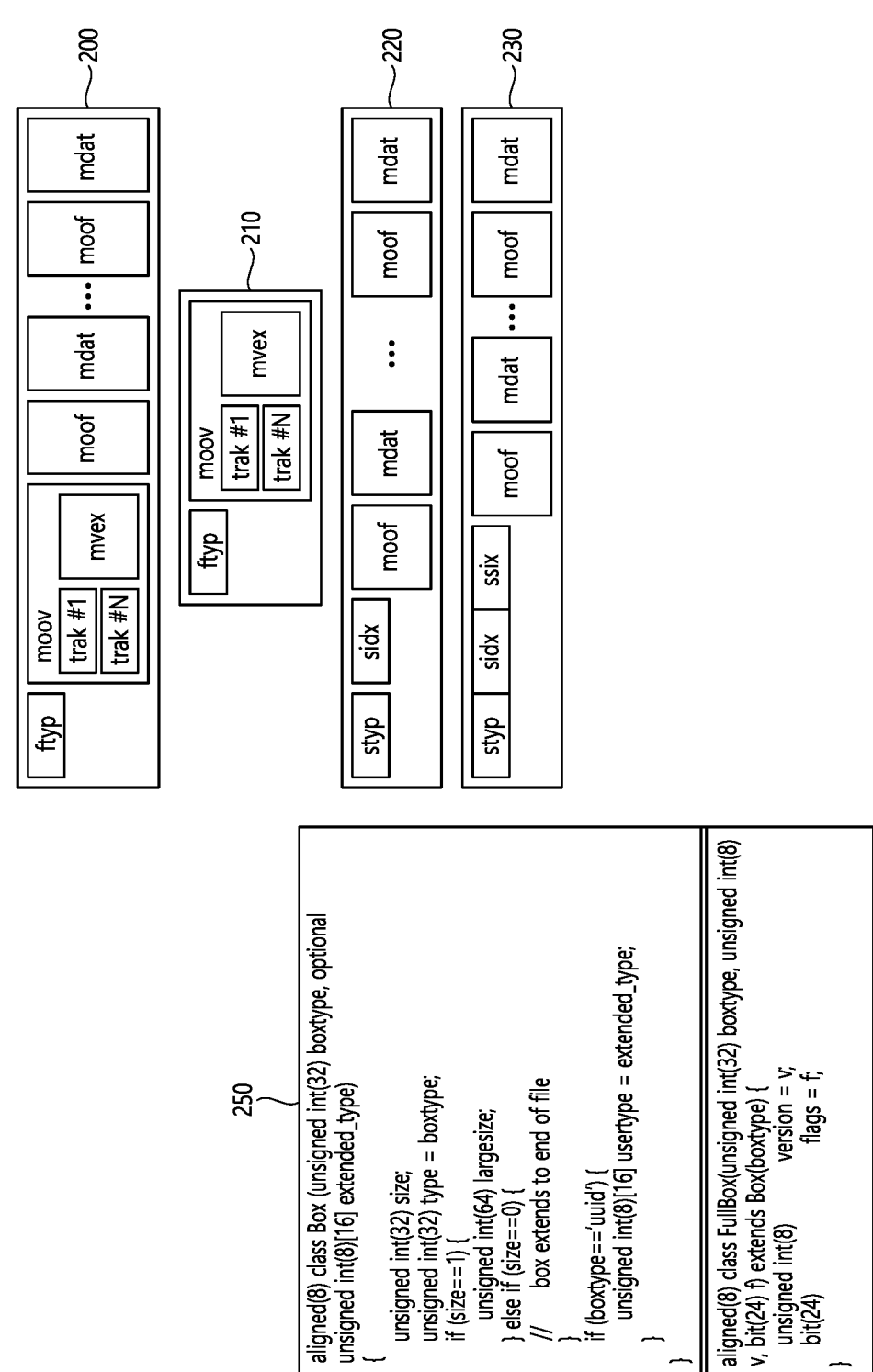
FIG. 1 and FIG. 2 are diagrams illustrating examples of a media file structure.

The present document may be modified in various forms, and specific embodiments thereof will be described and illustrated in the drawings. However, the embodiments are not intended for limiting the document. The terms used in the following description are used to merely describe specific embodiments, but are not intended to limit the document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the document are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the document without departing from the concept of the document.

Hereinafter, preferred embodiments of the present document will be described in more detail with reference to the attached drawings. Hereinafter, the same reference numbers will be used throughout this specification to refer to the same components and redundant description of the same component may be omitted.

Figure 2:
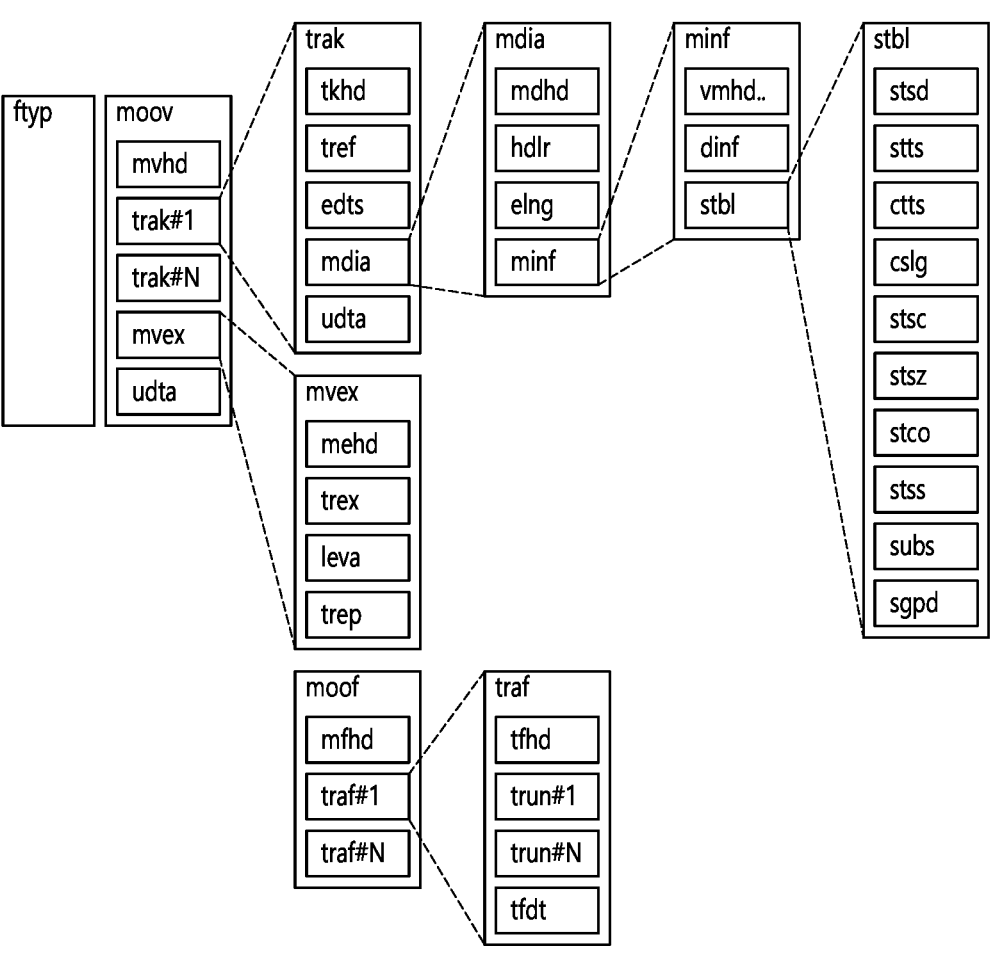

FIGS. 1 and 2 are diagrams illustrating an example of the structure of a media file.

The media file according to an embodiment may include at least one box. Here, a box may be a data block or an object including media data or metadata related to media data.

Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

The media file may be divided into a plurality of fragments according to an embodiment (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

A ssix box may be further included according to an embodiment 230. The ssix box (sub-segment index box) can provide information indicating an index of a sub-segment when a segment is divided into sub-segments.

Boxes in a media file, for example, can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, the fields (properties) of the video/image of the present document may be transferred by being included in the DASH-based adaptive streaming model.

Figure 3:
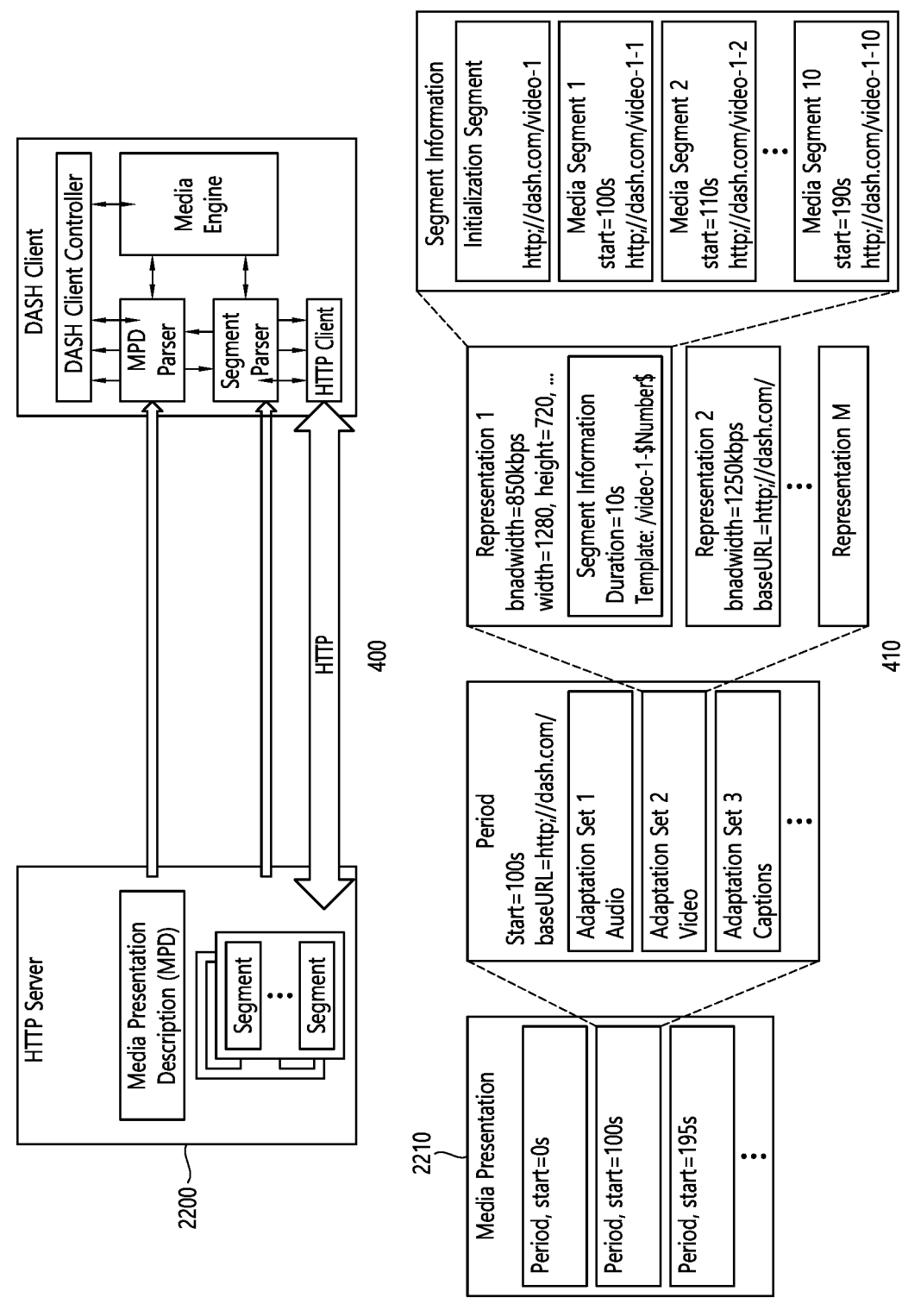
FIG. 3 is a diagram illustrating the overall operation of a DASH-based adaptive streaming model according to an embodiment of the present disclosure.

FIG. 3 is a diagram illustrating the overall operation of a DASH-based adaptive streaming model according to an embodiment of the present disclosure. A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming) As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 4:
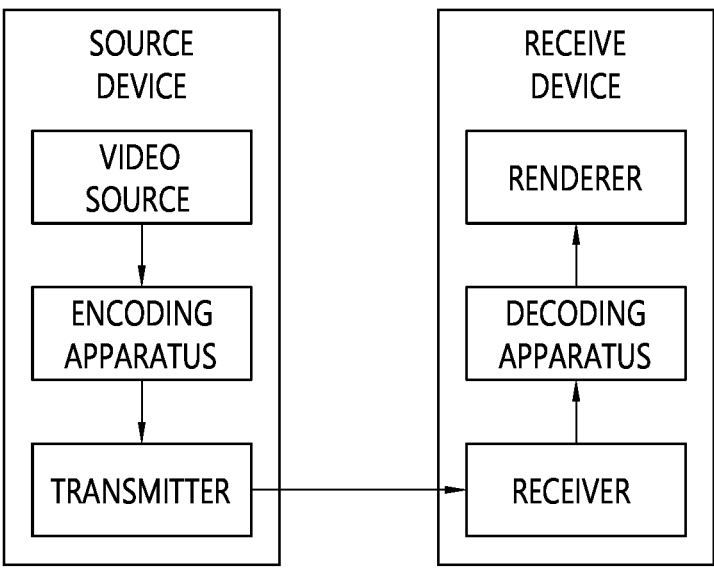
FIG. 4 schematically illustrates an example of a video/image coding system to which exemplary embodiments of the present document are applicable.

FIG. 4 schematically illustrates an example of a video/image coding system to which embodiments of this document may be applied.

Referring to FIG. 4, a video/image coding system may include a first apparatus (a source apparatus) and a second apparatus (a receiving apparatus). The source apparatus may deliver encoded video/image information or data in the form of a file or streaming to the receiving apparatus via a digital storage medium or network.

The source apparatus may include a video source, an encoding apparatus, and a transmitter. The receiving apparatus may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate apparatus or an external component.

The video source may acquire video/image through a process of capturing, synthesizing, or generating the video/image. The video source may include a video/image capture apparatus and/or a video/image generating apparatus. The video/image capture apparatus may include, for example, one or more cameras, video/image archives including previously captured video/images, and the like. The video/image generating apparatus may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving apparatus through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure provides various embodiments related to video/image coding, and unless otherwise explicitly stated, the embodiments may be performed in combination with each other.

In the present document, a video may mean a group of a series of images over time. A picture generally means a unit representing one image in a specific time period, and sub-picture/slice/tile are units constituting a part of a picture in coding. The subpicture/slice/tile may include one or more coding tree units (CTUs). One picture may be configured of one or more subpictures/slices/tiles. One picture may be configured of one or more subpictures/slices/tiles. One picture may be configured of one or more tile groups. One tile group may include one or more tiles. A brick may represent a rectangular region of CTU rows within a tile in a picture. A tile may be partitioned to a plurality of bricks, and each brick may be configured of one or more CTU rows within the tile. A tile that is not partitioned to a plurality of bricks may also be referred to as a brick. A brick scan may represent a particular sequential ordering of CTUs that partition a picture. Herein, the CTUs may be aligned by CTU raster scanning in a brick, bricks in a tile may be consecutively (or continuously) aligned by a raster scan of the bricks of the tile, and tiles in a picture may be consecutively aligned by a raster scan of the tiles of the picture. A subpicture may represent a rectangular region of one or more slices in a picture. That is, a subpicture may include one or more slices that collectively cover a rectangular region of a picture. A tile is a particular tile column and a rectangular region of CTUs within a particular tile column. The tile column is a rectangular region of the CTUs, and the rectangular region as a same height as a height of the picture, and a width of the rectangular region may be specified by syntax elements in a picture parameter set. The tile row is a rectangular region of CTUs, and the rectangular region has a width that is specified by the syntax elements in a picture parameter set and a height that is the same as the height of the picture. A tile scan may represent a particular sequential ordering of CTUs partitioning a picture, the CTUs may be consecutively aligned by a CTU raster scan in the tile, and tiles in a picture may be consecutively aligned by a raster scan of the tiles of the picture. A slice may include an integer number of bricks of a picture, wherein the integer number of bricks may belong to a NAL unit. A slice may be configured of a plurality of complete tiles or may be a consecutive sequence complete bricks of on tile. In the present disclosure, a tile group and a slice may be interchangeably used. For example, in the present disclosure, a tile group/tile group header may also be referred to as a slice/slice header.

A pixel or a pel may mean the smallest unit constituting one picture (or image). Also, 'sample' may be used as a term corresponding to the pixel. A sample may generally represent a pixel or a value of a pixel and may represent only a pixel/pixel value of the luma component or only a pixel/pixel value of the chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Technical features that are individually described in one drawing in this document may be implemented individually or may be implemented at the same time.

The following Figures are made to explain specific examples of the present document. Since the names of specific apparatuses or names of specific signals/messages/fields described in the figures are provided as examples, the technical features of the present document are not limited to the specific names used in the figures below.

Figure 5:
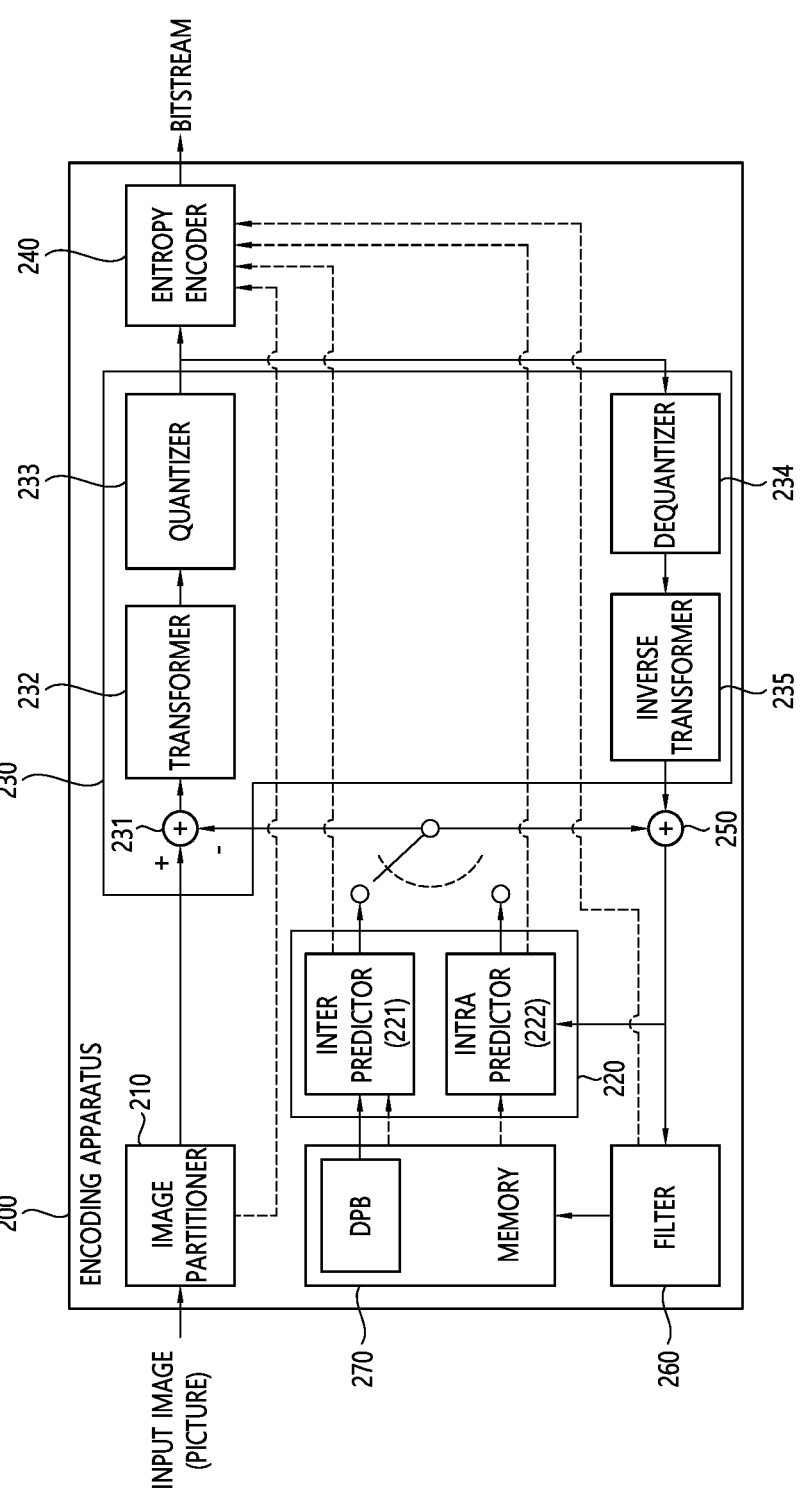
FIG. 5 is a diagram for schematically explaining a configuration of a video/image encoding apparatus to which exemplary embodiments of the present document are applicable.

FIG. 5 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 5, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 6:
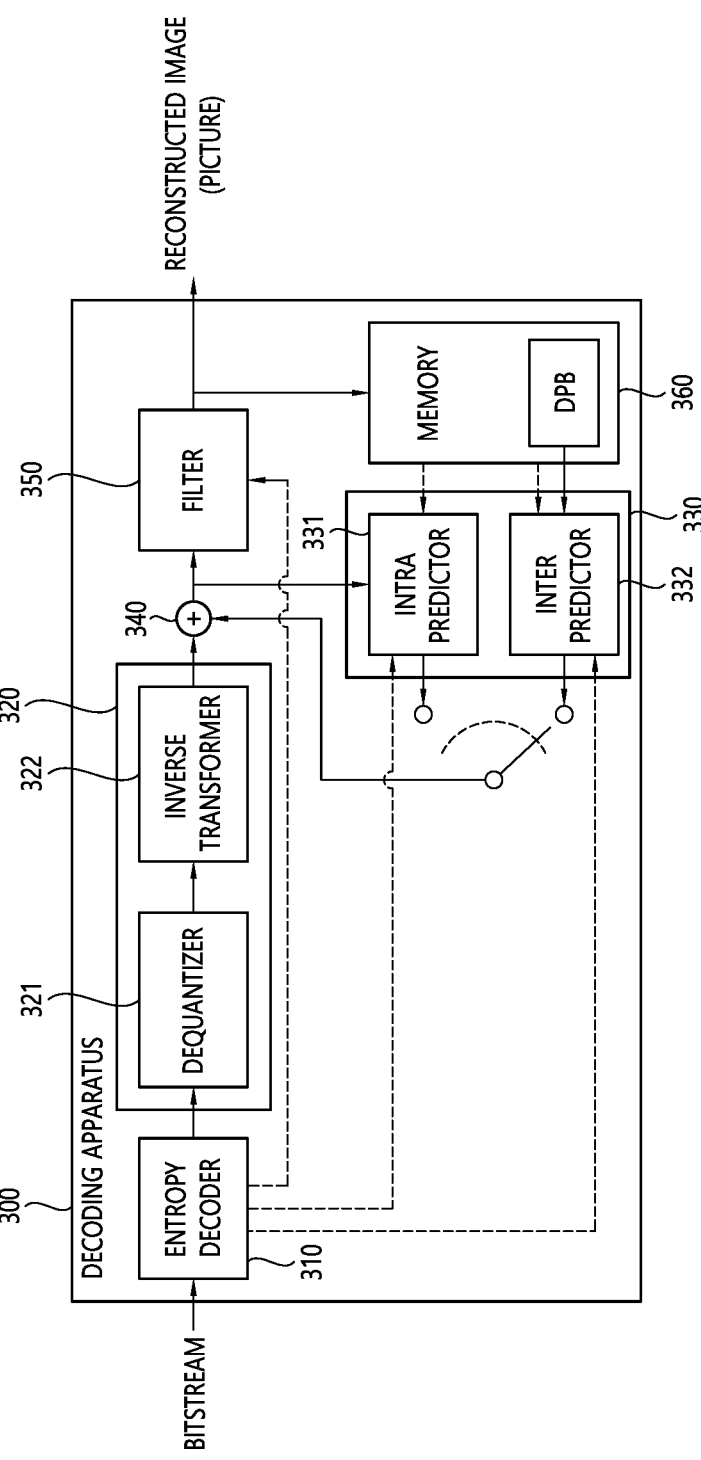
FIG. 6 is a diagram schematically explaining a configuration of a video/image decoding apparatus to which exemplary embodiments of the present document are applicable.

FIG. 6 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 6, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 5. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 5 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

Meanwhile, the above-described encoded image/video information may be configured based on a media file format in order to generate a media file. For example, the encoded image/video information may form a media file (segment) based on one or more NAL unit/sample entries on the encoded image/video information. The media field may include a sample entry and a track. For example, a media file (segment) may include various records, and each record may include information related to image/video information or information related to a media file format. Additionally, for example, one or more NAL units may be stored in a configuration record (or decoder configuration record, or VVC decoder configuration record) field of a media file. Herein, the field may also be referred to as a syntax element.

For example, an ISO Base Media File Format (ISOBMFF) may be used as a media file format to which the method/embodiment disclosed in the present disclosure may be applied. The ISOBMFF may be used as the basis of various codec encapsulation formats, such as an AVC file format, an HEVC file format and/or a VVC file format, and so on, and various multimedia container formats, such as an MPEG-4 file format, a 3GPP file format (3GP) and/or a DVB file format, and so on. Additionally, apart from the continuous media, such as audio and video, static media, such as image, and metadata may be stored in a file according to the ISOBMFF. A file that is structured according to the ISOBMFF may be used for various purposes, such as local media file playback, progressive downloading of a remote file, segments for Dynamic Adaptive Streaming over HTTP (DASH), containers and packetization instructions of contents to be streamed, recording of received real-time media streams, and so on.

A 'box' that will hereinafter be described may be an elementary syntax element of the ISOBMFF. An ISOBMFF file may be configured of a sequence of boxes, and another box may be included in a box. For example, a movie box (a box having a grouping type of 'moov') may include metadata for continuous media streams belonging to media file, and each stream may be indicated in the file as a track. Metadata on a track may belong to a track box (a box having a grouping type of 'trak'), and media content of a track may be included in a media data box (a box having a grouping type of 'mdat') or may directly belong to a separate file. Media content of a track may be configured of a sequence of samples, such as audio or video access units. For example, the ISOBMFF may designate various types of tracks, such as media track including elementary media stream, hint track including media transmission instructions or indicating a received packet stream, timed metadata track including timed metadata track.

Additionally, although the ISOBMFF is designed for storage purposes, it is also very useful when performing progressive download or performing streaming, such as DASH. For the purpose of streaming movie fragments that are defined in ISOBMFF may be used. A fragmented ISOBMFF file may, for example, be indicated as two separate files related to video and audio, respectively. For example, when a random access is included after a 'moov' has been received, all movie fragments 'moof' may be decoded together with the related media data.

Additionally, the metadata of each track may include a list of sample description entries, which provides a coding or encapsulation format that is used in the track and initialization data needed for processing the corresponding format. Additionally, each sample may be connected to one of the sample description entries of the track.

When using the ISOBMFF, sample-specific metadata may be designated by various mechanisms. Particular boxes in the sample table box (a box having a grouping type of 'stbl') may be standardized in order to respond to general requirements. For example, a Sync sample box (a box having a grouping type of 'stss') may be used for listing random access samples of a track. By using the sample grouping mechanism, samples may be mapped according to a four-character grouping type to a designated sample group sharing a same property, which is designated to a sample group description entry in the file. Various grouping types may be designated to the ISOBMFF.

Figure 7:
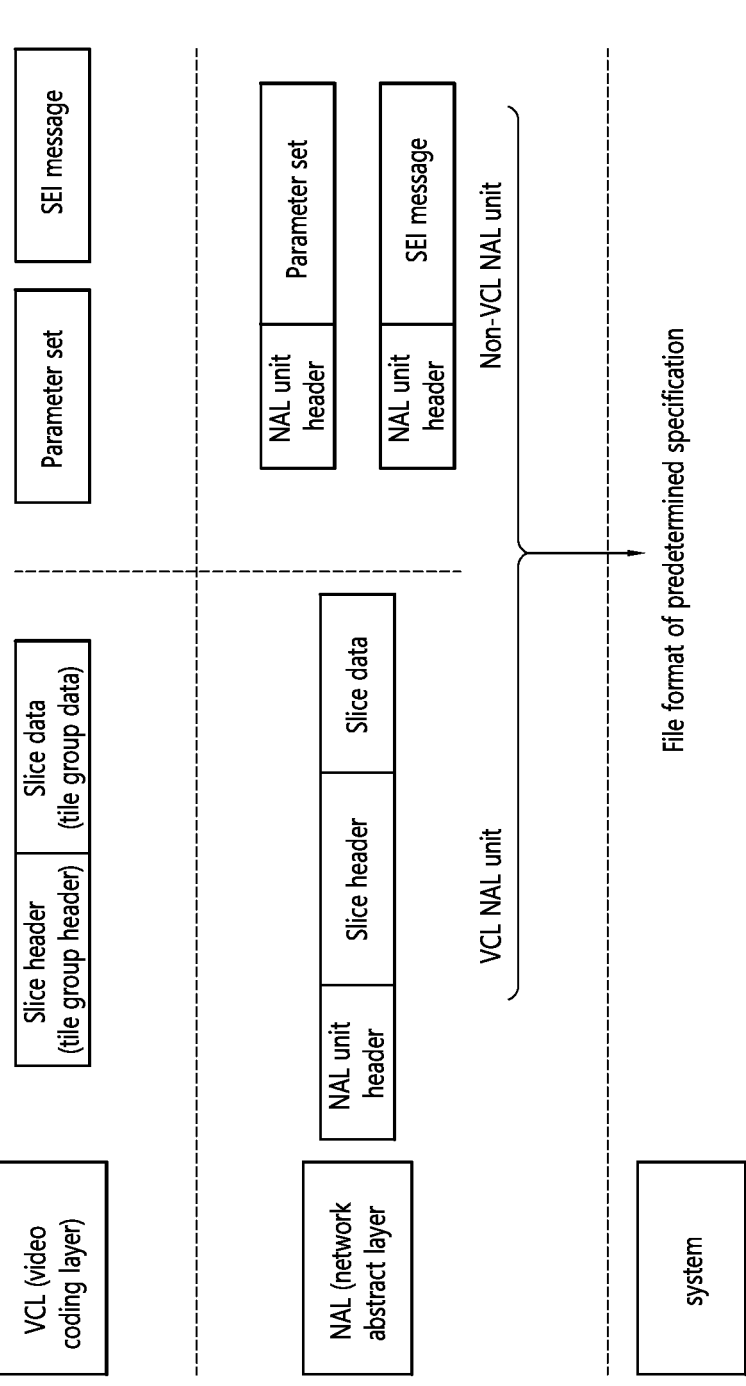
FIG. 7 shows an exemplary hierarchical structure for a coded video/image.

FIG. 7 shows an exemplary hierarchical structure for a coded video/image.

Referring to FIG. 7, coded image/video is divided into a video coding layer (VCL) that handles the decoding process of the image/video and itself, a subsystem that transmits and stores the coded information, and a network abstraction layer (NAL) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in FIG. 7, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

Adaptation Parameter Set (APS) NAL unit: Type for NAL unit including APS

Decoding Parameter Set (DPS) NAL unit: Type for NAL unit including DPS

Video Parameter Set (VPS) NAL unit: Type for NAL unit including VPS

Sequence Parameter Set (SPS) NAL unit: Type for NAL unit including SPS

Picture Parameter Set (PPS) NAL unit: Type for NAL unit
  including PPS

Picture header (PH) NAL unit: Type for NAL unit includ-
  ing PH

The aforementioned NAL unit types may have syntax
information for the NAL unit type, and the syntax informa-
tion may be stored and signaled in a NAL unit header. For
example, the syntax information may be nal_unit_type, and
NAL unit types may be specified by a nal_unit_type value.

Meanwhile, as described above, one picture may include
a plurality of slices, and one slice may include a slice header
and slice data. In this case, one picture header may be further
added to a plurality of slices (a slice header and a slice data
set) in one picture. The picture header (picture header
syntax) may include information/parameters commonly
applicable to the picture. For example, one picture may be
configured of different types of slices, such as an intra-coded
slice (i.e., I-slice) and/or inter-coded slice (i.e., P-slice and
B-slice). In this case, a picture header may include infor-
mation/parameters being applied to an intra-coded slice and
an inter-coded slice. Alternatively, one picture may also be
configured of one type of slices.

The slice header (slice header syntax) may include infor-
mation/parameters commonly applicable to the slice. The
APS (APS syntax) or PPS (PPS syntax) may include infor-
mation/parameters commonly applicable to one or more
slices or pictures. The SPS (SPS syntax) may include
information/parameters commonly applicable to one or
more sequences. The VPS (VPS syntax) may include infor-
mation/parameters commonly applicable to multiple layers.
The DPS (DPS syntax) may include information/parameters
commonly applicable to the entire video. The DPS may
include information/parameters related to concatenation of a
coded video sequence (CVS).

In the present specification (or document), the video/
image information that is encoded and signaled in the form
of a bitstream from the encoding apparatus to the decoding
apparatus may not only include information related to intra-
picture partitioning, intra/inter prediction information, infor-
mation related to inter-layer prediction, residual informa-
tion, in-loop filtering information, and so on, but may also
include information included in the slice header, information
included in the picture header, information included in the
APS, information included in the PPS, information included
in the SPS, information included in the VPS, and/or infor-
mation included in the DPS. Additionally, the video/image
information may further include information of the NAL
unit header.

In the present disclosure, the embodiments described in
the filter 260, the inter predictor 221, and the intra predictor
222 of the encoding apparatus 200 may be the same as or
respectively applied to correspond to the filter 350, the inter
predictor 332, and the intra predictor 331 of the decoding
apparatus 300.

Meanwhile, the above-described encoded image/video
information may be configured based on a media file format
in order to generate a media file. For example, encoded
image/video information may form a media file (segment)
based on one or more NAL unit/sample entries for the
encoded image/video information. The media file may
include a sample entry and a track. For example, the media
file (segment) may include various records, and each record
may include information related to image/video or informa-
tion related to a media file format. Additionally, for example,
one or more NAL units may be stored in a configuration
record (or decoder configuration record or VVC decoder configuration record) field of a media file. Herein, a field
may also be referred to as a syntax element.

Meanwhile, a 'sample' that will hereinafter be described
may be a single time of one of 3 sample arrays (Y, Cb, Cr)
representing a picture or all data related to a single element.
For example, when the term 'sample' is used in the context
of a track (of a media file format), a 'sample' may mean all
data related to a single time of the corresponding track.
Herein, a time may be a decoding time or a composition
time. Additionally, for example, when the term 'sample' is
used in the context of a picture, i.e., when the term is used
in a phrase such as "luma sample", then, a sample may
indicate a single element belonging to one of the 3 sample
arrays representing a picture.

Meanwhile, the following three types of elementary
streams may be defined in order to store VVC content:
  a video elementary stream that does not include a param-
    eter set, wherein all parameter sets may be stored in a
    sample entry or sample entries
  a video and parameter set elementary stream that may
    include parameter sets and a sample entry or sample
    entries having the parameter sets stored therein
  a non-VCL elementary stream including non-VCL NAL
    units being synchronized with an elementary stream
    that is included in a video track; herein, a VVC
    non-VCL track does not include parameter sets in the
    sample entries.

Meanwhile, operating points information of an ISO based
media file format (ISOBMFF) for VVC may be signaled to
a sample from a group box having a grouping type of 'vopi'
or an entity group having a group type of 'opeg'. Herein, an
operatinng point may be a temporal subset of an Output
Layer Set (OLS) that is identified by an OLS index and a
highest TemporalId value. Each operating point may be
related to a profile, a tier, and a level (i.e., PTL) defining
conformance point of each operating point. The operating
points information may be needed for identifying a sample
and a sample entry from each operating point.

Applications may be provided with information on the
constitution of operating points by using various operating
points provided from a given VVC bitstream and an oper-
ating points information sample group 'vopi'. Each operat-
ing point may be related to an OLS, a highest TemporalId
value, and profile, level, and tier signaling. All of the
above-described information may be captured by a 'vopi'
sample group. Apart from the above-described information,
the sample group may also provide dependency information
among layers.

Meanwhile, when one or more VVC tracks exist for a
VVC bitstream and an Operating Points entity group does
not exist for the VVC bitstream, all of the following details
may be applied:
  among VVC tracks for the VVC bitstream, there should
    be only one track delivering the 'vopi' sample group.
  all other VVC tracks of the VVC bitstream should have an
    'oref' type track reference for the track delivering the
    'vopi' sample.

Additionally, for a particular sample of a given track, a
temporally collocated sample of another track may be
defined as a sample having the same decoding time as the
particular sample. For each sample SN of a track TN having
an 'oref' track reference for a track Tk, which delivers the
'vopi' sample group, the following may be applied:
  when a temporal collocated sample Sk exists in a track Tk,
    a sample SN may be related to the same 'vopi' sample
    group entity as sample Sk.
  otherwise, a sample SN may be related to a same 'vopi'
    sample group entity as sample Sk.

When several VPSs are referenced in a VVC bitstream, several entities may have to be included in a sample group description box to which the grouping_type 'vopi' belongs. In a more general case where a single VPS exists, it may be recommended to include an operating points information sample group in a sample table box, without including it in each track fragment, by using a default sample group mechanism, which is defined in ISO/IEC 14496-12.

Additionally, a grouping_type_parameter may not be defined for a SampleToGroupBox having a grouping type of 'vopi'.

The syntax of the 'vopi' sample group including the above-described operating points information, i.e., the operating points information sample group, may be as shown below in the following table.

TABLE 1

```
class VvcOperatingPointsRecord {
    unsigned int (8) num_profile_tier_level_minus1;
    for (i=0; i<=num_profile_tier_level_minus1; i++) {
        unsigned int (8) ptl_max_temporal_id[i];
        VvcPTLRecord (ptl_max_temporal_id[i]+1) ptl[i];
    }
    unsigned int (1) all_independent_layers_flag;
    bit (7) reserved = 0;
    if (all independent_layers_flag) {
    unsigned int (1) each_layer_is_an_ols_flag;
        bit (7) reserved = 0;
    } else
        unsigned int (8) ols_mode_idc;
    unsigned int (16) num_operating_points;
    for (i=0; i<num_operating_points) {
        unsigned int (16) output_layer_set_idx;
        unsigned int (8) ptl_idx;
        unsigned int (8) max_temporal_id;
        unsigned int (8) layer_count;
        for (j=0; j<layer_count; j++) {
            unsigned int (6) layer_id;
            unsigned int (1) is_outputlayer;
            bit (1) reserved = 0;
        }
        bit (6) reserved = 0;
        unsigned int (1) frame_rate_info_flag
        unsigned int (1) bit_rate_info_flag
        if (frame_rate_info_flag) {
            unsigned int (16) avgFrameRate;
            bit (6) reserved = 0;
            unsigned int (2) constantframeRate;
        }
        if (bit_rate_info_flag) {
            unsigned int (32) maxBitRate,
            unsigned int (32) avgBitRate;
        }
    }
    unsigned int (8) max_layer_count;
    for (i=0; i<max_layer_count; i++) {
        unsigned int (8) layerID;
        unsigned int (8) num_direct_ref_layers;
        for (j=0, j<num_direct_ref_layers; j++)
            unsigned int (8) direct_ref_layerID;
        unsigned int (8) max_tid_il_ref_pics_plus1;
    }
}
class VvcOperatingPointsInformation extends VisualSampleGroupEntry ('vopi') {
    VvcOperatingPointsRecord oinf;
}
```

Additionally, semantics for the syntax of the operating points information sample group may be as shown below in the following table.

TABLE 2 num_profile_tier_level_minus1 plus 1 gives the number of following profiles, tier, and
   level combinations as well as the associated fields,
ptl_max_temporal_id[i] : Gives the maximum TemporalID of NAL units of the
   associated bitstream for the specified i-th profile, tier, and level structure.
      NOTE: The semantics of ptl_max_temporal_id[i] and max_temporal_id of an operating point,
     given below, are different even though they may carry the same numerical value.
ptl [1] specifies the i-th profile, tier, and level structure.
all_independent_layers_flag, each_layer_is_an_ols_flag, ols_mode_idc
   and max_tid_il_ref_pics_plus1    are defined in ISO/IEC 23090-3.
num_operating_points: Gives the number of operating points for which the information
   follows.
output_layer_set_idx is the index of the output layer_set that defines the operating
   point. The mapping between output_layer_set_idx and the layer_id values
   shall be the same as specified by the VPS for an output layer set with index
   output_layer_set_idx.
ptl_idx: Signals the zero-based index of the listed profile, level, and tier structure for the
   output layer set with index output_layer_set_idx.
max_temporal_id: Gives the maximum TemporalId of NAL units of this operating point.
   NOTE: The maximum TemporalId value Indicated in the layer information sample group has different
semantics
   from the maximum TemporalId indicated here. However, they may carry the same literal numerical values.
layer_count: This field indicates the number of necessary layers, as defined ISO/IEC 23090-
   3, of this operating point.
layer_id: provides the nuh_layer_id values for the layers of the operating point.
is_outputlayer: A flag that indicates if the layer is an output layer or not. A one indicates an
   output layer.
frame_rate_info_flag equal to 0 indicates that no frame rate information is present for
   the operating point. The value 1 indicates that frame rate information is present for the
   operating point.
bit_rate_info_flag equal to 0 indicates that no bitrate information is present for the
   operating point. The value 1 indicates that bitrate information is present for the operating
   point.
avgFrameRate gives the average frame rate in units of frames/(256 seconds) for the
   operating point. Value 0 indicates an unspecified average frame rate.
constantFrameRate equal to 1 indicates that the stream of the operating point is of
   constant frame rate. Value 2 indicates that the representation of each temporal layer in the
   stream of the operating point is of constant frame rate. Value 0 indicates that the stream of
   the operating point may or may not be of constant frame rate.
maxBitRate gives the maximum bit rate in bits/second of the stream of the operating point,
   over any window of one second.
avgBitRate gives the average bit rate in bits/second of the stream of the operating point.
max_layer_count: The count of all unique layers in all of the operating points that relate to
   this associated base track.
layerID: nuh_layer_id of a layer for which the all the direct reference layers are given in the
   following loop of direct_ref_layerID.
num_direct_ref_layers: The number of direct reference layers for the layer with
   nuh_layer_id equal to layerID.
direct_ref_layerID: nuh_layer_id of the direct reference layer.

Additionally, for example, the operating points entity group may be defined to be able to provide track mapping of the operating points and profile level information of the operating points.

When aggregating samples of a track being mapped to the operating point that is described above in the operating points entity group, an implicit reconstruction process no longer needs to remove any more NAL units in order to obtain a conforming VVC bitstream. A track belonging to the operating points entity group should have a track reference of the 'oref' type for a group_id that is indicated in the operating points entity group.

Additionally, all entity_id values being included in the operating points entity group should belong to the same VVC bitstream. If present (or existing), an OperatingPoint-GroupBox is included in a GroupsListBox of a movie-level MetaBox and is not included in a file-level or track-level MetaBox. Herein, the OperatingPointGroupBox may indicate the operating points entity group.

A syntax of the above-described operating points entity group may be as shown below is the following table.

TABLE 3

```
aligned (8) class OperatingPointGroupBox extends
EntityToGroupBox ('opeg', 0,0)
{
    unsigned int (8) num_profile_tier_level_minus1;
    for (i=0; i <= num_profile_tier_level_minus1; i++)
        VvcPTLRecord (0) opeg_ptl[i];
    unsigned int (16) num_operating_points;
    for (i=0; i<num_operating_points) {
        unsigned int (16) output_layer_set_idx;
        unsigned int (8) ptl_idx;
        unsigned int (8) max_temporal_id;
        unsigned int (8) layer_count;
        for (j=0; j<layer_count; j++) {
            unsigned int (6) layer_id;
            unsigned int (1) is_outputlayer;
            bit(1) reserved = 0;
        }
        bit (6) reserved = 0;
        unsigned int (1) frame_rate_info_flag
        unsigned int (1) bit_rate_info_flag
        if (frame_rate_info_flag) {
            unsigned int (16) avgFrameRate;
```

TABLE 3-continued

```
        bit (6) reserved = 0;
        unsigned int (1) frame_rate_info_flag
        unsigned int (1) bit_rate_info_flag
        if (frame_rate_info_flag) {
            unsigned int(16) avgFrameRate;
            bit (6) reserved = 0;
            unsigned int (2) constantFrameRate;
        }
        if (bit_rate_info_flag) {
            unsigned int (32) maxBitRate;
            unsigned int (32) avgBitRate;
        }
        unsigned int (8) entity count;
        for (j=0; j<entity_count; j++) {
            unsigned int (8) entity_idx;
        }
    }
}
```

Additionally, semantics for the syntax of the operating points entity group may be as shown below in the following table.

TABLE 4 num_profile_tier_level_minus1 plus1 gives the number of following profiles, tier, and level combinations as well as the associated fields.
opeg_ptl[i] specifies the i-th profile, tier, and level structure.
num_operating_points: Gives the number of operating points for which the information follows.
output_layer_set_idx is the index of the output layer_set that defines the operating point. The mapping between output_layer_set_idx and the layer_id values shall be the same as specified by the VPS for an output layer_set with index output_layer_set_idx.
ptl_idx: Signals the zero-based index of the listed profile, level, and tier structure for the output layer_set with index output_layer_set_idx.
max_temporal_id: Gives the maximum TemporalId of NAL units of this operating point.
  NOTE: The maximum TemporalId value indicated in the layer information sample group has different semantics from the maximum TemporalId indicated here, However, they may carry the same literal numerical values.
layer_count: This field indicates the number of necessary layers, as defined ISO/IEC 23090-3, of this operating point.
layer_id: provides the nuh_layer_id values for the layers of the operating point.
is_outputlayer: A flag that indicates if the layer is an output layer or not. A one indicates an output layer.
frame_rate_info_flaq equal to 0 indicates that no frame rate information is present for the operating point. The value 1 indicates that frame rate information is present for the operating point.
bit_rate_info_flag equal to 0 indicates that no bitrate information is present for the operating point. The value 1 indicates that bitrate information is present for the operating point.
avgFrameRate gives the average frame rate in units of frames/(256 seconds) for the operating point. Value 0 indicates an unspecified average frame rate.
constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.
maxBitRate gives the maximum bit rate in bits/second of the stream of the operating point, over any window of one second.
avgBitRate gives the average bit rate in bits/second of the stream of the operating point.
entity_count specifies the number of tracks that are present in an operating point.
entity_idx specifies the index to the entity_id list in the entity group that belongs to an operating point.

Additionally, for example, a media file may include decoder configuration information for an image/video content. That is, a media file may include a VVC decoder configuration record including decoder configuration information.

When the VVC decoder configuration record is stored in a sample entry, the VVC decoder configuration record may include not only a parameter set but also a size of a length field that is used for each sample in order to indicate a length of a NAL unit included in the VVC decoder configuration record. The VVC decoder configuration record may be formed (or configured) configured from an external source (frame) (herein, a size of the VVC decoder configuration record is provided from a structure including the VVC decoder configuration record).

Additionally, the VVC decoder configuration record may include a version field. For example, a version in the present disclosure may define Version 1 of the VVC decoder configuration record. Changes that are not compatible with the VVC decoder configuration record may be indicated as a change in the version number. In the version number is not recognized, readers should not decode the VVC decoder configuration record or a stream to which the corresponding record applies.

Compatible extensions for the VVC decoder configuration record may not change the configuration version code. Readers should be prepared to ignore (or disregard) unrecognized data exceed the data definition understood by the readers.

When a track essentially includes a VVC bitstream, or when the track resolves the problem through 'subp' track references, a VvcPtlRecord should exist in the decoder configuration record. Additionally, when a ptl_present_flag in the decoder configuration record if a track is equal to 0, the track should include an 'oref' track record.

When a stream that is described in the VVC decoder configuration record is being decoded, values of syntax elements of VvcPTRecord, chroma_format_idc, and bit_depth_minus8 may be valid for all parameter sets that are being activated. Most particularly, the following limitation may be applied:

a profile indication general_profile_idc indicates a profile that is followed by a stream being associated with the present configuration record.

A tier indication general_tier_flag may indicate a tier that is the same or higher than the highest tier indicated in all parameter sets.

Each bit of a general_constraint_info may be configured only when all parameter sets configure the corresponding bit.

A level indication general_level_idc may indicate a level of capacity that is equal to or higher than the highest level indicated for the highest tier among the parameter sets.

Additionally, restrictions may be applied to chroma_format_idc as follows:

When a value of sps_chroma_format_idc that is defined in ISO/IEC 23090-3 is the same in all SPSs being reference by a NAL unit of a track, chroma_format_idc should be identical to sps_chroma_format_idc.

Conversely, when ptl_present_flag is equal to 1, the chroma_format_idc should be equal to vps_ols_dpb_chroma_format[output_layer_set_idx], which is defined in ISO/IEC 23090-3.

Otherwise (i.e., in a case where the above-described conditions do not apply), the chroma_format_idc does not exist.

In addition to other important format information used in a VVC video elementary stream, explicit indication of a chroma format and a bit depth may be provided from the VVC decoder configuration record. If color space information is different in VUI information of the two sequences, two different VVC sample entries may be needed.

Additionally, for example, a set of arrays delivering initialization NAL units may be included in the VVC decoder configuration record. The NAL unit types may be limited to indicate only DCI, VPS, SPS, PPS, prefix APS, and prefix SEI NAL units. The NAL unit types being reserved by ISO/IEC 23090-3 and the present disclosure may be defined in the future, and readers may be required to ignore (or disregard) arrays having reserved NAL unit type or unauthorized values.

Meanwhile, arrays may exist in an order of DCI, VPS, SPS, PPS, prefix APS, and prefix SEI.

A syntax of the above-described VVC decoder configuration record may be as shown below is the following table.

TABLE 5

```
aligned (8) class VvcPTLRecord (num_sublayers) {
    unsigned int (8) num_bytes_constraint_info;
    unsigned int (7) general_profile_idc;
    unsigned int (1) general_tier_flag;
    unsigned int (8) general_level_idc;
    unsigned int (1) ptl_frame_only_constraint_flag;
    unsigned int (1) ptl_multilayer_enabled_flag;
    if (num_bytes_constraint info > 0)
        unsigned int (8*num_bytes_constraint_info − 2)
    general_constraint_info; for (i=num_sublayers − 2; 1 >= 0; i−−)
        unsigned int (1) ptl_sublayer_level_present_flag[i];
    for (j=num_sublayers; j <= 8 && num_sublayers > 1; j++)
        bit (1) ptl_reserved_zero_bit = 0;
    for (i=num_sublayers−2; i >= 0; i−−)
        if (ptl_sublayer_level_present[i])
            unsigned int (8) sublayer_level_idc[i];
    unsigned int (8) num_sub_profiles;
    for (j=0) j < num_sub_profiles; j++)
        unsigned int (32) general_sub_profile_idc;
}
aligned (8) class VvcDecoderConfigurationRecord {
    unsigned int (8) configurationVersion = 1,
    unsigned int (16) avgFrameRate;
    unsigned int (2) constantFrameRate;
    unsigned int (3) numTemporalLayers;
    unsigned int (2) lengthsizeMinusOne;
    unsigned int (1) ptl_present_flag;
    if (ptl_present_flag) {
        VvcPTLRecord (numTemporalLayers) track_ptl;
        unsigned int (16) output_layer_set_idx;
    }
    unsigned int (1) chroma_format_present_flag;
    if (chroma_format_present_flag)
        unsigned int (2) chroma_format_idc;
    else
        bit (2) reserved = '11'b;
    unsigned int (1) bit_depth_present_flag;
    if (bit_depth_present_flag)
        unsigned int (3) bit_depth_minus8;
    else
        bit (3) reserved = '111'b;
    unsigned int (1) reserved= '1'b;
    unsigned int (8) numOfArrays;
    for (j=0; j < numOfArrays; j++) {
        unsigned int (1) array_completeness;
        bit (1) reserved = 0;
        unsigned int (6) NAL_unit_type;
        unsigned int (16) numNalus;
        for (i=0; i< numNalus; i++) {
            unsigned int (16) nalUnitLength;
            bit (8*nalUnitLength) nalUnit;
        }
    }
}
```

Additionally, semantics for the syntax of the VVC decoder configuration record may be as shown below in the following table.

TABLE 6 general_profile_idc, general_tier_flag, general_sub_profile_idc,
general_constraint_info, general_level_idc,
ptl_frame_only_constraint_flag, ptl_multilayer_enabled_flag,
sublayer_level_present, and sublayer_level_idc[i] contain the matching
values for the fields general_profile_idc, general_tier_flag, general_sub_profile_idc, the bits in
general_constraint_info( ), general_level_idc, ptl_multilayer_enabled_flag,
ptl_frame_only_constraint_flag, sublayer_level_present, and sublayer_level_idc[i] as defined
in ISO/IEC 23090-3, for the stream to which this configuration record applies.

TABLE 6-continued avgFrameRate gives the average frame rate in units of frames/(256 seconds), for the stream
   to which this configuration record applies. Value 0 indicates an unspecified average frame
   rate.
constantFrameRate equal to 1 indicates that the stream to which this configuration record
   applies is of constant frame rate. Value 2 indicates that the representation of each temporal
   layer in the stream is of constant frame rate. Value 0 indicates that the stream may or may
   not be of constant frame rate.
numTemporalLayers greater than 1 indicates that the track to which this configuration
   record applies is temporally scalable and the contained number of temporal layers (also
   referred to as temporal sublayer or sublayer in ISO/IEC 23090-3) is equal to
   numTemporalLayers. Value 1 indicates that the track to which this configuration record
   applies is not temporally scalable. Value 0 indicates that it is unknown whether the track to
   which this configuration record applies is temporally scalable.
lengthsizeMinusOne plus 1 indicates the length in bytes of the NALUnitLength field in a
   VVC video stream sample in the stream to which this configuration record applies. For
   example, a size of one byte is indicated with a value of 0. The value of this field shall be one
   of 0, 1, or 3 corresponding to a length encoded with 1, 2, or 4 bytes, respectively.
ptl_present_flag equal to 1 specifies that the track contains a VVC bitstream
   corresponding to a specific output layer_set. ptl_present_flag equal to 0 specifies that
   the track may not contain a VVC bitstream corresponding to a specific output layer_set, but
   rather may contain one or more individual layers that do not form an output layer_set or
   individual sublayers excluding the sublayer with TemporalId equal to 0.
num_sub_profiles defines the number of sub profiles indicated in the decoder
   configuration record.
track_ptl specifies the profile, tier, and level of the output layer_set represented by the VVC
   bitstream contained in the track.
output_layer_set_idx specifies the output layer_set index of an output layer_set
   represented by the VVC bitstream contained in the track. The value of
   output_layer_set_idx may be used as the value of the TargetOlsIdx variable provided
   by external means to the VVC decoder, as specified in ISO/IEC 23090-3, for decoding the
   bitstream contained in the track.
chroma_format_present_flag equal to 0 specifies that chroma_format_idc is not
   present. chroma_format_present_flag equal to 1 specifies that
   chroma_format_idc is present.
chroma_format_idc indicates the chroma format that applies to this track, The following
   constraints apply for chroma_format_idc.
     - If the value of sps_chroma_format_idc, as defined in ISO/IEC 23090-3, is the same in
       all SPSs referenced by the NAL units of the track, chroma_format_idc shall be
       equal to sps_chroma_format_idc.
     - Otherwise, if ptl_present_flag is equal to 1, chroma_format_idc shall be
       equal to vps_ols_dpb_chroma_format [output_layer_set_idx], as
       defined in ISO/IEC 23090-3.
     - Otherwise, chroma format idc shall not be present.
bit_depth_present_flag equal to 0 specifies that bit_depth_minus8 is not present
   bit_depth_present_flag equal to 1 specifies that bit_depth_minus8 is present.
bit_depth_minus8 indicates the bit depth that applies to this track. The following
   constraints apply for bit_depth_minus8:
     - If the value of sps_bit_depth_minus8, as defined in ISO/IEC 23090-3, is the same in all
       SPSs referenced by the NAL units of the track, bit_depth_minus8 shall be equal to
       sps_bitdepth_minus8.
     - Otherwise, if ptl_present_flag is equal to 1, bit_depth_minus8 shall be
       equal to vps_ols_dpb_bit_depth_minus8[ output_layer_set_idx], as
       defined in ISO/IEC 23090-3.
     - Otherwise, bit_depth_minus8 shall not be present.
numArrays indicates the number of arrays of NAL units of the indicated type(s).
array completeness when equal to 1 indicates that all NAL units of the given type are in
   the following array and none are in the stream; when equal to 0 indicates that additional
   NAL units of the indicated type may be in the stream; the default and permitted values are
   constrained by the sample entry name.
NAL unit_type indicates the type of the NAL units in the following array (which shall be all
   of that type); it takes a value as defined in ISO/IEC 23090-2; it is restricted to take one of the
   values indicating a DCI, VPS, SPS, PPS, APS, prefix SEI, or suffix SEI NAL unit.
numNalus indicates the number of NAL units of the indicated type included in the
   configuration record for the stream to which this configuration record applies. The SEI
   array shall only contain SEI messages of a 'declarative' nature, that is, those that provide
   information about the stream as a whole. An example of such an SEI could be a user-data
   SEI.
nalUnitLength indicates the length in bytes of the NAL unit.
nalUnit contains a DCI, VPS, SPS, PPS, APS or declarative SEI NAL unit, as specified in
   ISO/IEC 23090-3.

For example, referring to Table 6 above, syntax elements general_profile_idc, general_tier_flag, general_sub_profil-e_idc, general_constraint_info, general_level_idc, ptl_frame_only_constraint_flag, ptl_multilayer_enabled_flag, sublayer_level_present, and sublayer_level_idc[i] may include matching values for fields general_profile_idc, general_tier_flag, and general_sub_profile_idc, bits in general_constraint_info( ), general_level_idc, ptl_multilay-er_enabled_flag, ptl_frame_only_constraint_flag, sublayer_level_present, and sublayer_level_idc[i], as defined in ISO/IEC 23090-3, for the streams to which the VVC decoder configuration record is applied. Herein, avgFrameRate may provide an average frame rate in units of frame/(256 sec-onds) for the streams to which the VVC decoder configu-ration record is applied. A value of 0 may indicate that an average frame rate is not given (or designated).

Additionally, for example, referring to Table 6, the syntax element constantFrameRate may indicate a constant frame rate for the VVC decoder configuration record. For example, a constantFrameRate that is equal to 1 may indicate that a stream to which the VVC decoder configuration record is applied has a constant frame rate. A constantFrameRate having a value equal to 2 may indicate that a representation of each temporal layer of a stream has a constant frame rate. A constantFrameRate having a value equal to 0 may indicate that the stream may or may not have a constant frame rate.

Additionally, for example, referring to Table 6, the syntax element numTemporalLayers may indicate a number of temporal layers being included in a track to which the VVC decoder configuration record is applied. For example, if the numTemporalLayers is greater than 1, this may indicate that the track to which the VVC decoder configuration record is applied may be temporally scalable, and that the number of temporal layers (referred to as temporal sublayers or sublay-ers in ISO/IEC 23090-3) included in the track is equal to the numTemporalLayers. A numTemporalLayers having a value of 1 may indicate that the track to which the VVC decoder configuration record is applied is not temporally scalable. A numTemporalLayers having a value of 0 may indicate that whether or not the track to which the VVC decoder con-figuration record is applied is temporally scalable is unknown.

Additionally, for example, referring to Table 6, the syntax element lengthSizeMinusOne may indicate a length in bytes of a NALUnitLength field, which is included in a VVC video stream sample to which the present configuration record is applied. For example, the size of 1 byte may be indicated with a value of. The values of lengthSizeMinu-sOne may be one of 0, 1, and 3 each corresponding to lengths encoded with 1, 2, and 4 bytes, respectively.

Additionally, for example, referring to Table 6, the syntax element ptl_present_flag may indicate that a track includes a VVC bitstream corresponding to a particular (or specific) output layer set, and, accordingly, whether or not PTL information is included. For example, a pd_present_flag having a value of 1 may indicate that the track includes a VVC bitstream corresponding to a specific output layer set (specific OLS). And, a ptl_present_flag having a value of 0 may indicate that the track may not include a VVC bitstream corresponding to a specific OLS yet include one or more individual sublayers that do not form an OLS or an indi-vidual sublayer excluding the sublayer having a TemporalId that is equal to 0.

Additionally, for example, referring to Table 6, the syntax element num_sub_profiles may define a number of subpro-files that are marked in the VVC decoder configuration record.

Additionally, for example, referring to Table 6, the syntax element track_ptl may indicate profile, tier, and level of an OLS indicated by a VVC bitstream that is included in the track.

Additionally, for example, referring to Table 6, the syntax element output_layer_set_idx may indicate an output layer set index of an output layer set indicated by a VVC bitstream that is included in the track. A value of the output_layer_set_idx may be used as a value of a TargetOlsIdx parameter, which is provided by an external means to a VVC decoder, as given in ISO/IEC 23090-3, in order to decode the bitstream that is included in the track.

Additionally, for example, referring to Table 6, the syntax element chroma_format_present_flag may indicate whether or not a chroma_format_idc exists. For example, a chroma_format_present_flag having a value of 0 may indicate that the chroma_format_idc does not exist. A chroma_format_present_flag having a value of 1 may indicate that the chroma_format_idc exists.

Additionally, for example, referring to Table 6, the syntax element chroma_format_idc may indicate a chroma format that is applied to the track. For example, the following restrictions may be applied to chroma_format_idc:

when a value of an sps_chroma_format_idc, as defined in ISO/IEC 23090-3, is the same in all SPSs being refer-enced by a NAL unit of the track, chroma_format_idc should be the same as sps_chroma_format_idc.

alternatively, if the ptl_present_flag is equal to 1, the chroma_format_idc should be the same as vps_ol-s_dpb_chroma_format[output_layer_set_idx], as defined in ISO/IEC 23090-3.

otherwise (i.e., if none of the above-described restrictions apply), the chroma_format_idc does not exist.

Additionally, for example, referring to Table 6, the syntax element bit_depth_present_flag may indicate whether or not a bit_depth_minus8 exists. For example, a bit_depth_pre-sent_flag having a value of 0 may indicate that the bit_depth_ minus8 does not exist. And, a bit_depth_present_flag having a value of 1 may indicate that the bit_depth_minus8 exists.

Additionally, for example, referring to Table 6, the syntax element a bit_depth_minus8 may indicate a bit depth being applied to the track. For example, the following restrictions may be applied to bit_depth_minus8:

when a value of an sps_bitdepth_minus8, as defined in ISO/IEC 23090-3, is the same in all SPSs being refer-enced by a NAL unit of the track, sps_bitdepth_minus8 should be the same as sps_bitdepth_minus8.

alternatively, if the ptl_present_flag is equal to 1, the bit_depth_minus8 should be the same as vps_ols_dpb_bitdepth_minus8[output_layer_set_idx], as defined in ISO/IEC 23090-3.

otherwise (i.e., if none of the above-described restrictions apply), the bit_depth_minus8 does not exist.

Additionally, for example, referring to Table 6, the syntax element numArrays may indicate a number of NAL unit arrays of the indicated type(s).

Additionally, for example, referring to Table 6, the syntax element array_completeness may indicate whether or not additional NAL units may exist in the stream. For example, if the array_completeness is equal to 1, this may indicate that all NAL units of a given type are included in a following (or next) array but not included in the stream. Additionally, for example, if the array_completeness is equal to 0, this may indicate that additional NAL units of the indicated type may be included in the stream. A default value and a permitted (or authorized) value may be limited (or constrained) sample entry name.

Additionally, for example, referring to Table 6, the syntax element NAL_unit_type may indicate types of the NAL units in a following array (all types should be included). The NAL_unit_type may have a value as defined in ISO/IEC 23090-2. Additionally, the NAL_unit_type may be limited to have one of the values indicating the DCI, VPS, SPS, PPS, APS, prefix SEI or suffix SEI NAL units, respectively.

Additionally, for example, referring to Table 6, the syntax element numNalus may indicate a number of NAL units of the indicated type being included in the VVC decoder configuration record for the stream to which the VVC decoder configuration record is applied. Ans SEI array may only include an SEI message of a 'declarative' nature, i.e., a message providing information on the entire (or whole) stream. An example of such SEI may be a user-data SEI.

Additionally, for example, referring to Table 6, the syntax element nalUnitLength may indicate a byte length of a NAL unit.

Additionally, for example, a nalUnit may include may include a DCI, VPS, SPS, PPS, APS or declarative SEI NAL unit, as specified in ISO/IEC 23090-3.

Meanwhile, an operating point may first be determined in order to reconstruct an access unit from samples of multiple tracks delivering a multilayer VVC bitstream. For example, when a VVC bitstream is represented as multiple VVC tracks, a file parser may identify track that are needed for operating points, which are selected as follows.

For example, the file parser may find all tracks having a VVC sample entry. In case the tracks include an 'oref' track reference for a same ID, the corresponding ID may be verified as a VVC track or 'opeg' entity group. The operating point may be selected from an 'opeg' entity group or 'vopi' entity group that is appropriate for the decoding capacity and application purposes.

In case the 'opeg' entity group exists, a set of tracks accurately indicating the selected operating points may be indicated. Therefore, a VVC bitstream may be reconstructed from the set of tracks and may be decoded.

Additionally, in case the 'opeg' entity group does not exist (i.e., in case a 'vopi' sample group exists), a set of tracks that is needed for decoding the selected operating points may be searched from 'vopi' and 'linf' sample groups.

In order to reconstruct a bitstream from a plurality of VVC tracks delivering a VVC bitstream, a target highest (or maximum) value of the TemporalId may need to be determined. In case the plurality of tracks include data for an access unit, the alignment (or array) of each of the samples in the tracks may be performed based on sample decoding times. That is, a time-to-sample table may be used without considering edit lists.

When the VVC bitstream is represented with a plurality of VVC tracks, if the tracks are combined into a single stream by extending the decoding time, the decoding time of the samples may need to have an accurate access unit order as given in ISO/IEC 23090-3. Meanwhile, a sequence of access units may be reconstructed from each sample of the tracks that are needed according to the implicit reconstruction process, which will hereinafter be described. For example, the implicit reconstruction process of a VVC bitstream may be as described below.

For example, in a case where an Operating Points Information sample group exists, a needed (or required) track may be selected based on a layer and reference layer that deliver as indicated in the Operating Points Information and layer information sample groups.

Additionally, for example, in a case where an Operating Points Entity Group exists, a needed (or required) track may be selected based on information of an OperatingPoint-GroupBox.

Additionally, for example, in a case where a VCL NAL unit reconstructs a bitstream including a sublayer having a TemporalId that is greater than 0, all lower-level sublayers (i.e., sublayers having VCL NAL units with lower TemporalId values) within the same layer may be included in a resulting bitstream, and a required track may be selected accordingly.

Additionally, for example, in a case where an access unit is reconstructed, picture units (regulated in ISO/IEC 23090-3) may be assigned to access units according to an increasing order of nuh_layer_id values from samples having the same decoding time.

Additionally, for example, in a case where an access unit is reconstructed by using dependent layers and a max_ti-d_il_ref_pics_plus1 is greater than 0, sublayers of layers for a VCL NAL unit having a TemporalId value that is less than or equal to max_tid_il_ref_pics_plus1−1 (indicated in the operating point information sample group) within the same layer may also be included in the resulting bitstream, and a required track may be selected accordingly.

Additionally, for example, in a case where the VVC track includes a 'subp' track reference, each picture unit may be reconstructed as given in clause 11.7.3 of ISO/IEC 23090-3 along with additional restrictions (or limitations) on EOS and EOB NAL units, which are given below. The process described in clause 11.7.3 of ISO/IEC 23090-3 may be repeated for each layer of a target operating point according to an increasing order of the nuh_layer_id. Otherwise, each picture unit may be reconstructed as described below.

Reconstructed access units may be assigned to a VVC bitstream according to an increasing order of the decoding time, and, as additionally described below, duplicates of end of bitstream (EOB) and end of sequence (EOS) NAL units may be removed from the VVC bitstream.

Additionally, for example, for access units existing in a same coded video sequence of the VVC bitstream and belonging to different sublayers stored in multiple tracks, one or more tracks may exist, wherein the one or more tracks include an EOS NAL unit having a specific nuh_layer_id in each of the samples. In this case, only one of the EOS NAL units may be maintained in a last access unit (the unit having the greatest decoding time), among the access units, in the final reconstructed bitstream, and the only one EOS NAL unit may be assigned behind all NAL units excluding the EOB NAL unit (if present) of the last access unit, among the access units, and other EOS NAL units may be deleted. Similarly, one or more tracks including an EOB NAL unit may exist in each sample. In this case, among the EOB NAL units, only one EOB NAL unit may be maintained in the final reconstructed bitstream and may be assigned to a last end of such access units, and other EOB NAL units may be deleted.

Additionally, for example, since a specific layer or sublayer may be represented by one or more tracks, when searching for a needed track for an operating point, the track may need to be selected from a set of tracks all delivering the specific layer or the sublayer.

Additionally, for example, in case the operating points entity group does not exist, after selecting a tracks from the tracks delivering the same layer or sublayer, the final track that is needed may be collectively deliver part of the layers or sublayers that still do not belong to target operating point. Although a bitstream that is reconstructed for the target operating point is delivered by a final required track, layers or sublayers that do not belong to the target operating point may not be included.

Meanwhile, according to the present disclosure, for efficient processing, region-based independent processing may be supported. For this, a specific region may be extracted and/or processed, so as to configure an independent bitstream, and a file format may be formed (or configured) for the specific region extraction and/or processing. In this case, circle coordinates information of the extracted region may be signaled so as to supported efficient image region decoding and rendering at the receiving end. Hereinafter, a region being supported with independent processing of an input image may be referred to a subpicture. A subpicture, for example, may be used in 360-degrees video/image content, such as VR or AR. However, the subpicture will not be limited only to this. For example, in 360-degrees video/image content, a part that is seen (or viewed) by a user may not be all (or the whole) of the 360-degrees video/image content but may only be a part of the content. The subpicture may be used for independently processing the part of the 360-degrees video/image content, which is viewed by the user, apart from other parts of the content. The input image may be split into subpicture sequences prior to encoding, and each subpicture sequence may cover a subset of a spatial area of the 360-degrees video/image content. Each subpicture sequence may be independently encoded and output as a single-layer bitstream. Each subpicture bitstream may be encapsulated within a file based on an individual track or may be streamed. In this case, a receiving apparatus may decode and render the tracks covering the whole region, or may select a track related to a specific subpicture and may then decode and render the selected subpicture. Hereinafter, the concept and characteristics of a subpicture that is used in the VVC standard will be described in detail.

A subpicture being used in a VVC may be referred to as a VVC subpicture. A VVC subpicture may be a rectangular region including one or more slices in a picture. That is, the subpicture may include one or more slices covering the rectangular region of a picture. The VVC subpicture may include one or more complete tile or a part of one tile. The encoder may consider boundaries of a subpicture to be the same as boundaries of a picture and may not use loop filtering across the subpicture boundaries. Therefore, it may be possible to extract the selected subpictures from a VVC bitstream, or to encode a subpicture so that it can be integrated with a destination VVC bitstream. Additionally, such VVC bitstream extraction or integration process may be performed without modification (or correction) of the VCL NAL unit. Subpicture identifiers (IDs) for a subpicture existing in a bitstream may be marked through SPS or PPS. Hereinafter, 'VVC' may be omitted from VVC subpicture, VVC track, VVC subpicture track, and so on, for simplicity.

Meanwhile, the above-described media file may be included in a track. That is a bitstream including video/image data may be stored in the above-described track, thereby forming (or configuring) a media file. Types of the tracks, more specifically, types of tracks for transporting VVC elementary streams are as listed below in the following table.

TABLE 7

VVC file format defines several types of tracks as follows:
a)  VVC track; A VVC track represents a VVG bitstream by including NAL units in its samples and. sample entries and possibly by referencing other VVC tracks containing other sublayers of the VVC bitstream and possibly by referencing VVC subpicture tracks. When a VVC track references VVC subpicture tracks, it is referred to as a VVC base track.
b)  VVC non-VCL track: APSs, which carry ALF, LMCS, or scaling list parameters, and other non-VCL NAL units can be stored in and transmitted through a track that is separate from the track containing the VCL NAL units; this is the VVC non-VCL track.
c)  VVC subpicture track: A VVC subpicture track contains either of the following:
    A sequence of one or more VVC subpictures.
    A sequence of one or more complete slices forming a rectangular area.
    A sample of a VVC subpicture track contains either of the following:
        One or more complete subpictures as specified in ISO/IEC 23090-3 that are contiguous in decoding order.
        One or more complete slices as specified in ISO/IEC 23090-3 that form a rectangular area and are contiguous in decoding order.
    The VVG subpictures or slices included in any sample of a VVC subpicture track are contiguous in decoding order.
        NOTE: VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, sepment by segment This way, redundant transmission of APSs and other non-VCL NAL units can be avoided.

37 a) VVC track:

A VVC track may represent a VVC bitstream by including a NAL unit in a sample and/or sample entry of a VVC track, by referencing a VVC track including sublayers of another VC bitstream, or by referencing VVC subpicture tracks. In case the VVC track references VVC subpicture tracks, the VVC track may be referred to as a VVC base track.

b) VVC Non-VCL Track

APS transporting ALF, LMCS, or scaling list parameters, and other non-VCL NAL units may be stored and transmitted through a different track other than the track including the VCL NAL units. This track is an VVC non-VCL track.

c) VVC Subpicture Track

1) A subpicture track includes one of the following:

1-1) a sequence of one or more VVC subpictures 1-2) one or more complete slice sequences forming a rectangular region 2) A sample of a subpicture track includes one of the following:

2-1) one or more complete subpictures being specified in ISO/IEC 23090-3 and having a contiguous decoding order

2-2) one or more complete slices being specified in ISO/IEC 23090-3, having a contiguous decoding order and forming a rectangular region.

VVC subpicture tracks or slices being included in a random sample of a VVC subpicture track may be contiguous in the decoding order.

The VVC non-VCL tracks and the VVC subpicture tracks may optimally deliver VVC video within a streaming application as described below. The tracks may each be transported (or carried) in DASH representation of their own, wherein DASH representation including a subset of the VVC subpicture for decoding and rendering the subsets of the tracks and DASH representation including non-VCL tracks may be requested by clients for each segment. By using this method, redundant transmission of APS and other non-VCL NAL units may be prevented.

A method of reconstructing a picture unit from a sample in a VVC track that references VVC subpicture tracks may be as described below.

A sample of a VVC track may be resolved as an access unit including the following NAL units according to the order shown below in the following table.

TABLE 8

- The AUD NAL unit, if any, when present (and the first NAL unit) in the sample.
- When the sample is the first sample of a sequence of samples associated with the same sample entry, the parameter set and SEI NAL units contained in the sample entry, if any.
- The NAL units present in the sample up to and including the PH NAL unit.
- The content of the time-aligned (in decoding time) resolved sample from each referenced VVC subpicture track in the order specified in the 'spor' sample group description entry mapped to this sample, excluding all VPS, DCI, SPS, PPS, AUD, PH, EOS, and EOB NAL units, if any: The track references are resolved as specified below.

NOTE 1: If the referenced VVC subpicture track is associated with a VVC non-VCL track, the resolved sample of the VVC subpicture track contains the non-VCL NAL unit(s), if any, of the time-aligned sample in the VVC non-VCL track
- The NAL units that follow the PH NAL unit in the sample.

NOTE 2: The NAL units that follow the PH NAL unit in the sample could include suffix SEI NAL units, suffix APS NAL units, an BOS NAL unit, an EOB NAL unit, or reserved NAL units that are allowed after the last VCL NAL unit.

an AUD NAL unit (if any), when present (or existing) in the sample (and when being a first NAL unit)

parameter set and SEI NAL unit (if any) being included in the sample entry, when the sample is a first sample of a sequence of samples being associated with the same sample entry NAL unit (if any) existing in a sample up to a PH NAL unit and including a PH NAL unit content of a time-aligned resolved sample (being time-aligned in the decoding time) (if any) from each referenced VVC subpicture track according an order given by a 'spor' sample group description entry that is mapped to the sample, excluding all of the VPS, DCI, SPS, PPS, AUD, PH, EOS and EOB NAL units. The track reference may be resolved as described below. When the VVC subpicture track being references is associated with a VVC non-VCL track, the resolved sample of the VVC subpicture track includes non-VCL unit(s) (if any) that are time-aligned in the VVC non-VCL track NAL units following a PH NAL unit in the sample. The NAL units following the PH NAL unit in the sample may include suffix SEI NAL units, suffix APS NAL units, EOS NAL units, EOB NAL units or reserved NAL units that are authorized after the last VCL NAL unit.

Meanwhile, 'subp' track reference indexes of the 'spor' sample group description entry may be resolved as shown below in the following table.

TABLE 9

| |
|---|
| • If the track reference points to a track ID of a VVC subpicture track, the track reference is resolved to the VVC subpicture track. |
| • Otherwise (the track reference points to an 'alte' track group), the track reference is resolved to any of the tracks of the 'alte' track group. If a particular track reference index value was resolved to a particular track in the previous sample, it shall be resolved in the current sample to either of the following: <br> • the same particular track, or <br> • any other track In the same 'alte' track group that contains a sync sample that Is time-aligned with the current sample <br> NOTE 3: The VVC subpicture tracks in the same 'alte' track group are necessarily independent of any other VVC subpicture tracks referenced by the same VVC base track to avoid decoding mismatches and could therefore be constrained as follows: <br> • All the VVC subpicture tracks contain VVC subpictures. <br> • The subpicture boundaries are like picture boundaries. <br> • Loop filtering is turned off across subpicture boundaries. |

In a case where the track reference indicates a track ID of a VVC subpicture track, the track reference may be resolved to the VVC subpicture track.

In other cases, i.e., in a case where the track reference indicates an 'alte' track group, the track reference may be resolved to a random track of the 'alte' track group. In a case where a specific track reference index value is resolved to a specific sample of a previous sample, the corresponding value should be resolved to one of the following in a current sample:

the same specific track, and another random track within the 'alte' track group including a sync sample that is time-aligned with the current sample.

In order to avoid decoding mismatch from occurring, the VVC subpicture track in the 'alte' track should be mandatorily independent from all of the other VVC subpicture tracks being referenced by the same VVC base track, and may be restricted as follows:

all VVC subpicture tracks should include a VVC subpicture.

a boundary (or boundaries) of a subpicture should be the same as a boundary (or boundaries) of a picture.

loop filtering should be turned off across the boundary (or boundaries) of the subpicture. That is, loop filtering may not be performed near the subpicture boundary (or boundaries).

Meanwhile, when a reader makes an initial selection, or when the user selects VVC subpicture tracks including a VVC subpicture having a set of subpicture ID values that are different from a previous selection, the following steps may be performed as shown below in the following table.

TABLE 10

| |
|---|
| • The 'spor' sample group description entry is studied to conclude whether a PPS or SPS NAL unit needs to be changed. <br> NOTE: An SPS change is only possible at the start of a CLVS. <br> • If the 'spor' sample group description entry indicates that start code emulation prevention bytes are present before or within the subpicture IDs in the containing NAL unit, an RBSP is |

TABLE 10-continued derived from the NAL unit (i.e., start code emulation prevention bytes are removed). After the overriding in the next step, start code emulation prevention is re-done.
• The reader uses the bit position and subpicture ID length information in the 'spor' sample group entry to conclude which bits are overwritten to update the subpicture IDs to the selected ones.
• When the subpicture ID values of a PPS or SPS are initially selected, the reader needs to rewrite the PPS or SPS, respectively, with the selected subpicture ID values in the reconstructed access unit.
• When the subpicture ID values of a PPS or SPS are changed compared to the previous PPS or SPS (respectively) with the same PPS ID value or SPS ID value (respectively), the reader needs to Include a copy of that previous PPS and SPS (if the PPS or SPS with that same PPS or SPS ID value, respectively, is not present in the access unit otherwise) and rewrite the PPS or SPS (respectively) with with the updated subpicture ID values in the reconstructed access unit.

In order to determine whether a PPS or SPS NAL unit needs to be changed, a 'spor' sample group description entry may be studied. An SPS change may only be possible at a starting point of a CLVS.

In a case where the 'spor' sample group description entry indicates that start code emulation prevention bytes exist within or before a subpicture ID of a NAL unit including the bytes, RBSP may be derived from the NAL units (i.e., the start code emulation prevention bytes may be removed). After overriding is performed in the next phase, start code emulation prevention may be performed once again.

The reader may use a bit position and subpicture ID length information within the 'spor' sample group description entry in order to determine a bit that is to be used for overriding in order to update the subpicture ID to a selected subpicture ID.

In a case where the subpicture ID value of the PPS or SPS is initially selected, the reader may need to rewrite the PPS or SPS with the subpicture ID value that has been selected in a reconstructed access unit.

When the subpicture ID value of the PPS or SPS is changed after carrying a comparison between (each of) the same PPS ID value or SPS ID value and (each of) the previous PPS ID value or SPS ID value, the reader should include a duplicate of the previous PPS and SPS, and (each of) the PPS and SPS may need to be rewritten to the subpicture ID values that are updated in the reconstructed access unit.

Meanwhile, the following problems (or issues) related to the above-described track, subpicture, and slice may occur, as described below.

In the ISOBMFF, the current spec for transporting VVC permits (or allows) a subpicture track to include one or more complete slices, as specified in ISO/IEC 23090-3 (or VVC), that are contiguous in the decoding order and that configure (or form) a rectangular region. Herein, although a subpicture track includes one or more complete slices, the usefulness of the case of allowing not all slices to the included in one subpicture is unclear. That is, although a subpicture track includes slices, if not all of the slices are included in one subpicture, unless the slices are always referenced by the VVC basic track, which also references other subpicture tracks including the remaining slices of the same subpicture, the track becomes useless.

Accordingly, the present disclosure proposes the following solutions for the above-described problems. The proposed embodiments may be applied individually or in combination.

1. A subpicture may be limited to include all slices of one or more subpictures, as specified in ISO/IEC 23090-3.

2. As an alternative solution, if not all slices are included in one subpicture, even though the subpicture track includes one or more slices, all of the following conditions may be applied:

a) all slices within the subpicture track may belong to the same subpicture.

b) all VVC base tracks referencing the subpicture track also references subpicture track(s) including the remaining slices of the same subpicture.

Hereinafter, the above-described solutions will be described in more detail.

According to an embodiment proposed in the present disclosure, the VVC subpicture track may be limited to only one or more VVC subpictures. That is, according to Table 1 presented above, a VVC subpicture track was designed to include a sequence of one or more VVC subpicture or one or more complete slice sequences forming a rectangular region. According to the embodiment, the case where the VVC subpicture track includes one or more complete slice sequences forming a rectangular region may be excluded.

Additionally, the sample of the VVC subpicture track may be limited to include only one or more complete subpictures, as specified in ISO/IEC 23090-3, having a contiguous decoding order. That is, according to Table 1 presented above, the VVC subpicture track was designed to include one or more complete subpictures, as specified in ISO/IEC 23090-3, having a contiguous decoding order, or one or more complete slices, as specified in ISO/IEC 23090-3, having a contiguous decoding order and forming a rectangular region. According to the embodiment, the case where the VVC subpicture track includes one or more complete slice sequences, as specified in ISO/IEC 23090-3, having a contiguous decoding order and forming a rectangular region may be excluded.

In case of applying the present embodiment, the subpicture track may be configured to always include only one or more complete subpictures. Therefore, this has the effect of preventing the occurrence of the above-described problem, i.e., a case of allowing the subpicture track to include one or more complete slices yet not including all of the slices within one subpicture. Additionally, in case of applying the present embodiment, it may be advantageous in that a relationship between a VVC subpicture track, a VVC subpicture, and slices within the VVC subpicture may become simple and clear.

In summary, according to an embodiment of the present disclosure, the VVC subpicture track may, for example, be as shown below in the following table.

TABLE 11 c) VVC subpicture track: A VVC subpicture track contains either of the following
    A sequence of one or more VVC subpictures.
  A sample of a VVC subpicture track contains either of the following:
    One or more complete subpictures as specified in ISO/IEC 23090-3 that are contiguous in
      decoding order.
  The VVC subpictures or slices included in any sample of a VVC subpicture track are contiguous
  in decoding order.
      NOTE: VVC non-VCL tracks and VVC subpicture tracks enable an optimal delivery of VVG video in
      streaming applications as follows. These tracks can each be carried in DASH representations of their
      own, and for decoding and rendering of a subset of the tracks, the DASH representations containing the
      subset of the VVC subpicture tracks as well as the DASH representation containing the non-VCL tracks
      can be requested by the client, segment by segment. This way, redundant transmission of APSs and
      other non-VCL NAL units can be avoided.

According to another embodiment proposed in the present disclosure, in a case where the VVC subpicture track is allowed to include one or more complete slices but not include all of the slices in one subpicture, all of the following may be applied:

all slices within the subpicture track should belong to the same subpicture.

all VVC base tracks referencing the subpicture track should also reference subpicture track(s) including the remaining slices of the same subpicture.

In case of applying the present embodiment, in case the subpicture track includes one or more complete slices but does not include all slices in one picture, by limiting the configuration so that all of the slices in the subpicture track belong to the same subpicture, and so that all VVC base tracks referencing the subpicture track also reference sub-picture track(s) including the remaining slices of the same subpicture, this has an advantageous effect of resolving the above-described problem. That is, even though the subpicture track included slices, in case the slices are not all included in one subpicture, this may have an advantageous effect of preventing a case where the slices are not always referenced by the same VVC base track, which also references other subpicture tracks including remaining slices of the same subpicture, which then results in the track becoming useless. Additionally, in case of applying the present embodiment, it may be advantageous in that a relationship between a VVC subpicture track, a VVC subpicture, and slices within the VVC subpicture may become simple and clear.

In summary, according to an embodiment of the present disclosure, the VVC subpicture track may, for example, be as shown below in the following table.

TABLE 12 d) VVC subpicture track: A VVC subpicture track contains either of the following;
    A sequence of one or more VVC subpictures.
    A sequence of one or more complete slices forming a rectangular area.
  A sample of a VVC subpicture track contains either of the following:
    One or more complete subpictures as specified in ISO/IEC 23090-3 that are contiguous in
      decoding order,
    One or more complete slices as specified in ISO/IEC 23090-3 that form a rectangular area
      and are contiguous in decoding order.
  When a VVC subpicture track contains one or more complete slices but not all slices of a
  subpicture, all of the following applies:
    - All slices in the subpicture track shall belong to the same subpicture.
    - Any VVC base track that refers to the subpicture track shall also refer to subpicture track(s)
      that contain(s) the rest of slices from the same subpicture.
  The VVC subpictures or slices included in any sample of a VVC subpicture track are contiguous
  in decoding order.
      NOTE: VVC non-VCL tracks and VVC subpicture tracks enable an optimal delivery of VVC video In
      streaming applications as follows, These tracks can each be carried in DASH representations of their
      own, and for decoding and rendering of a subset of the tracks, the DASH representations containing the
      subset of the VVC subpicture tracks as well as the DASH representation containing the non-VCL tracks
      can be requested by the client, segment by segment. This way, redundant transmission of APSs and
      other non-VCL NAL units can be avoided FIG. 8 shows an example of a method for generating a media file to which the embodiment proposed in the present disclosure is applied.

Figure 8:
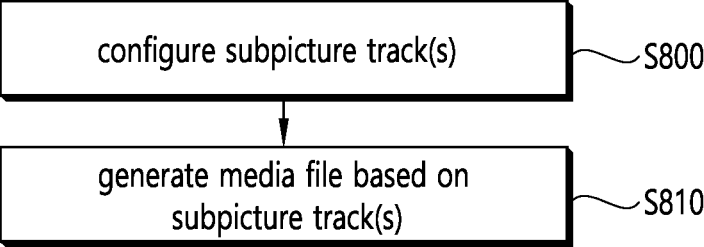
FIG. 8 shows an example of a method for generating a media file to which the embodiment proposed in the present disclosure is applied.

The process of FIG. 8 may be performed by a first apparatus. The first apparatus may, for example, include a transmission end, an encoding end, a media file generating end, and so on. However, the first apparatus will not be limited only to this.

Referring to FIG. 8, the first apparatus may form (or configure) a subpicture track (S800). As described above, the subpicture track may include a sequence of one or more VVC subpictures or a sequence of one of more complete slices forming a rectangular region. In other words, a sequence of one or more VVC subpictures or a sequence of one of more complete slices forming a rectangular region may be stored in the subpicture track may then be delivered.

After forming the subpicture track, the first apparatus may generate a media file based on the subpicture track (S810).

Figure 9:
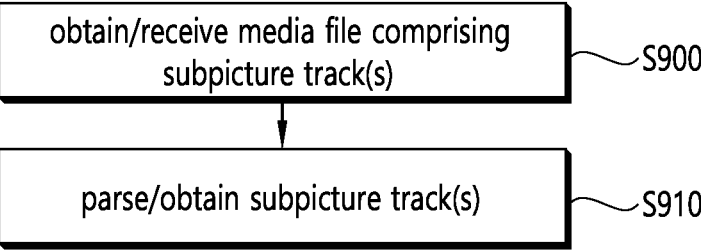
FIG. 9 shows an example of a method for processing a media file that is generated by applying the embodiment proposed in the present disclosure is applied.

FIG. 9 shows an example of a method for processing a media file that is generated by applying the embodiment proposed in the present disclosure is applied.

The process of FIG. 9 may be performed by a second apparatus. The second apparatus may, for example, include a reception end, a decoding end, a rendering end, and so on. However, the second apparatus will not be limited only to this.

Referring to FIG. 9, the second apparatus may obtain/receive a media file including a subpicture track (S900). The media file may be the media file generated by the first apparatus. The media file may include the above-described box and track, and a bitstream including the video/image data may be stored in the both and track within the media file. The track may include the above-described VVC track, VVC non-VCL track or VVC subpicture track, and so on.

The second apparatus may parse/obtain a subpicture track (S910). The second apparatus may parse/obtain a subpicture track included in the media file. For example, the second apparatus may reproduce a video/image by using video/image data stored in the subpicture track.

The media file, which is generated by the first apparatus and obtained/received by the second apparatus, may include the above-described (VVC) subpicture track. Based on the subpicture track, the second apparatus may derive one or more subpictures or one or more slices within the subpicture. Video/image decoding may be performed based on the slice(s) or subpicture(s).

Figure 10:
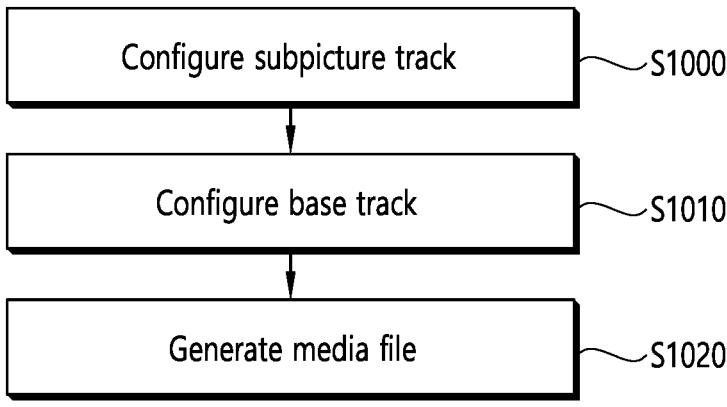
FIG. 10 shows a general view of a method for generating a media file performed by a apparatus for generating a media file according to the present disclosure.

FIG. 10 shows a general view of a method for generating a media file performed by a apparatus for generating a media file according to the present disclosure. The method disclosed in FIG. 10 may be performed by a apparatus for generating a media file (or media file generating apparatus), which is disclosed in FIG. 11. The media file generating apparatus may represent the above-described first apparatus. More specifically, for example, S1000 to S1010 of FIG. 10 may be performed by an image processor of the media file generating apparatus, and S1020 may be performed by a media file generator of the media file generating apparatus. Additionally, although it is not shown in the drawing, a process of encoding a bitstream, which includes image information, may be performed by an encoder of the media file generating apparatus.

The media file generating apparatus may form (or configure) a subpicture track (S1000). For example, the subpicture track formed in S1000 may include a VVC subpicture track. For example, the subpicture track may include a sequence of one or more (VVC) subpictures or a sequence of one or more complete slices. In other words, a sequence of one or more (VVC) subpictures or a sequence of one of more complete slices may be stored in the subpicture track and may then be delivered. The sequence of one of more complete slices may form a rectangular region.

For example, a sample of the subpicture track may include one or more complete subpictures, as specified in ISO/IEC 23090-3, or one or more complete slices, as specified in ISO/IEC 23090-3. The one or more complete subpictures may have a contiguous decoding order. The one or more complete slices may form a rectangular region. Additionally, the one or more complete slices may also have a contiguous decoding order.

For example, the media file generating apparatus may obtain encoded image information through a network or a (digital) storage medium. Herein, a network may include a broadcasting network and/or a communication network, and a digital storage medium may include various storage media such as USB, SD, CD, DVD, Blu-ray, HDD, SSD, and so on. Alternatively, for example, the media file generating apparatus may include an encoder and may derive the encoded image information.

The media file generating apparatus may form (or configure) a base track (S1010). The base track that is formed in step S1010 may, for example, include a VVC base track. The VVC base track may be the VVC track of a case where a VVC track references a subpicture. That is, when the VVC track references VVC subpicture tracks, the VVC track may be referred to as a VVC base track.

According to an embodiment, the subpicture track formed in step S1000 may include a plurality of subpicture tracks. For example, the subpicture track may include a first subpicture track and one or more second subpicture tracks. The first subpicture track may include one or more slices, wherein, in case the one or more slices are not all slices of the subpicture, all slices of the first subpicture track are included in a same subpicture as the corresponding subpicture, and a base track referencing the first subpicture track may reference the one or more second subpicture tracks, which include the remaining slices of the same subpicture.

More specifically, according to an embodiment, the subpicture may include first slices and second slices. That is, the subpicture may be formed of the first slices and the second slices. More specifically, the subpicture may be formed of second slices corresponding to the remaining slices that remain after excluding the first slices and the second slices. In other words, the second slices may be slices remaining after excluding the first slices.

There may be a case where the first subpicture track includes the first slices but does not include the second slices. As described above, when the first subpicture track includes the first slices, all slices within the first subpicture may form (or configure) the same subpicture, and a base track that references the first subpicture track may reference the one or more second subpicture tracks, wherein the one or more second subpicture tracks may include the second slices.

In other words, even in a case where a specific subpicture track includes only part of the slices and not all of the slices of one subpicture, the above-described problem may be resolved by setting limitations (or constraints) so that the remaining slices of the subpicture are included in another subpicture track that is also referenced by a base track, which references the specific subpicture track.

According to an embodiment, each of the subpicture tracks may include one or more subpictures or one or more slices. Herein, the one or more slices may form a rectangular region. Therefore, when each of the subpicture tracks includes the one or more slices, the one or more slices included in each of the subpicture tracks may form a rectangular region.

According to an embodiment, each of the subpicture tracks may include one or more subpictures, wherein one or more slices may not be included. Herein, the one or more slices may form part of a subpicture. By excluding the case where the subpicture track includes only part of the subpicture, i.e., the case where the subpicture track includes a slice that forms (or configures) only part of the subpicture, the above-described problem may be resolved. In this case, each of the subpicture tracks may be as presented above in Table 11.

According to an embodiment, a sample of the subpicture track may include one or more complete subpictures or one or more complete slices. Herein, the one or more complete slices may form a rectangular region. Therefore, in case a sample of the subpicture track includes the one or more complete slices, the one or more complete slices included in a sample of the subpicture track may form a rectangular region. The one or more complete subpictures may be contiguous in the decoding order. The one or more complete slices may be contiguous in the decoding order.

According to an embodiment, a sample of the subpicture track may include one or more complete subpictures, wherein the sample of the subpicture track may not include one or more complete slices. Herein, the one or more complete slices may form part of a subpicture. By excluding the case where a sample of the subpicture track includes only part of the complete subpicture, i.e., the case where a sample of the subpicture track includes a complete slice that forms (or configures) only part of the complete subpicture, the above-described problem may be resolved. In this case, a sample of the subpicture track may be as presented above in Table 11.

After forming a subpicture track and a base track by using the above-described method, the media file generating apparatus may generate a media file based on the subpicture track (S1020).

Meanwhile, although it is not shown in the drawing, the media file generating apparatus may store the generated media file in a (digital) storage medium or may deliver the generated media file to a media file processing apparatus through a network or a (digital) storage medium. Herein, a network may include a broadcasting network and/or a communication network, and a digital storage medium may include various storage media, such as USB, SD, CD, DVD, Blu-ray, HDD, SSD, and so on.

Figure 11:
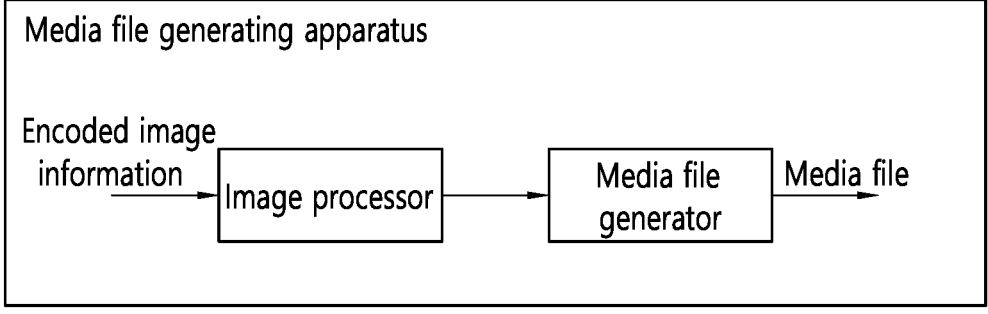
FIG. 11 shows a general view of a apparatus for generating a media file performing a method for generating a media file according to the present disclosure.

FIG. 11 shows a general view of a apparatus for generating a media file performing a method for generating a media file according to the present disclosure. The method disclosed in FIG. 10 may be performed by a apparatus for generating a media file (or media file generating apparatus), which is disclosed in FIG. 11. More specifically, for example, an image processor of the media file generating apparatus of FIG. 11 may perform S1000 to S1010 of FIG. 10, and a media file generator of the media file generating apparatus of FIG. 11 may perform S1020. Additionally, although it is not shown in the drawing, a process of encoding a bitstream, which includes image information may be performed by an encoder of the media file generating apparatus.

Figure 12:
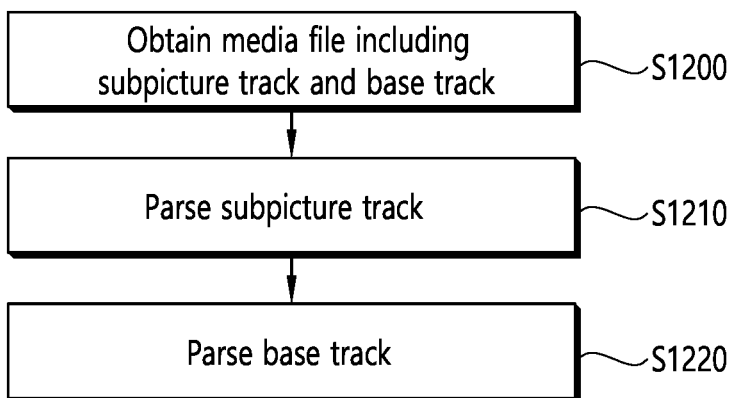
FIG. 12 shows a general view of a method for processing a media file performed by a apparatus for processing a media file according to the present disclosure.

FIG. 12 shows a general view of a method for processing a media file performed by a apparatus for processing a media file according to the present disclosure. The method disclosed in FIG. 12 may be performed by a apparatus for processing a media file (or media file processing apparatus), which is disclosed in FIG. 13. The media file processing apparatus may represent the above-described second apparatus. More specifically, for example, S1200 of FIG. 12 may be performed by a receiver of the media file processing apparatus, and S1210 and S1220 may be performed by a media file processor of the media file processing apparatus. Additionally, although it is not shown in the drawing, a process of decoding a bitstream based on a decoder configuration record may be performed by an encoder of the media file generating apparatus.

The media file processing apparatus obtains a media file including a subpicture track and a base track (S1200). For example, the media file processing apparatus may obtain the media file including the subpicture track and the base track through a network or (digital) storage medium. Herein, a network may include a broadcasting network and/or a communication network, and a digital storage medium may include various storage media, such as USB, SD, CD, DVD, Blu-ray, HDD, SSD, and so on.

The media file processing apparatus parses the subpicture track (S1210). For example, the media file processing apparatus may parse/derive the subpicture track.

The subpicture track that is parsed in S1210 may, for example, include a VVC subpicture track. For example, the subpicture track may include a sequence of one or more VVC subpictures or a sequence of one or more complete slices. In other words, a sequence of one or more VVC subpictures or a sequence of one of more complete slices may be delivered through the subpicture track. The sequence of one of more complete slices may form a rectangular region.

For example, a sample of the subpicture track may include one or more complete subpictures, as specified in ISO/IEC 23090-3, or one or more complete slices, as specified in ISO/IEC 23090-3. The one or more complete subpictures may have a contiguous decoding order. The one or more complete slices may form a rectangular region. Additionally, the one or more complete slices may also have a contiguous decoding order.

The media file processing apparatus parses the base track (S1220). For example, the media file processing apparatus may parse/derive the base track. The base track that is parsed in S1220 may, for example, include a VVC base track. The VVC base track may be the VVC track of a case where a VVC track references a subpicture. That is, when the VVC track references VVC subpicture tracks, the VVC track may be referred to as a VVC base track.

According to an embodiment, the subpicture track that is parsed in S1210 may include a plurality of subpicture tracks. For example, the subpicture track may include a first subpicture track and one or more second subpicture tracks. The first subpicture track may include one or more slices, wherein, in case the one or more slices are not all slices of the subpicture, all slices of the first subpicture track are included in a same subpicture as the corresponding subpicture, and a base track referencing the first subpicture track may reference the one or more second subpicture tracks, which include the remaining slices of the same subpicture.

More specifically, according to an embodiment, the subpicture may include first slices and second slices. That is, the subpicture may be formed of the first slices and the second slices. More specifically, the subpicture may be formed of second slices corresponding to the remaining slices that remain after excluding the first slices and the second slices. In other words, the second slices may be slices remaining after excluding the first slices.

There may be a case where the first subpicture track includes the first slices but does not include the second slices. As described above, when the first subpicture track includes the first slices, all slices within the first subpicture may form (or configure) the same subpicture, and a base track that references the first subpicture track may reference the one or more second subpicture tracks, wherein the one or more second subpicture tracks may include the second slices.

In other words, even in a case where a specific subpicture track includes only part of the slices and not all of the slices of one subpicture, the above-described problem may be resolved by setting limitations (or constraints) so that the remaining slices of the subpicture are included in another subpicture track that is also referenced by a base track, which references the specific subpicture track.

According to an embodiment, each of the subpicture tracks may include one or more subpictures or one or more slices. Herein, the one or more slices may form a rectangular region. Therefore, when each of the subpicture tracks includes the one or more slices, the one or more slices included in each of the subpicture tracks may form a rectangular region.

According to an embodiment, each of the subpicture tracks may include one or more subpictures, wherein one or more slices may not be included. Herein, the one or more slices may form part of a subpicture. By excluding the case where the subpicture track includes only part of the subpicture, i.e., the case where the subpicture track includes a slice that forms (or configures) only part of the subpicture, the above-described problem may be resolved. In this case, each of the subpicture tracks may be as presented above in Table 11.

According to an embodiment, a sample of the subpicture track may include one or more complete subpictures or one or more complete slices. Herein, the one or more complete slices may form a rectangular region. Therefore, in case a sample of the subpicture track includes the one or more complete slices, the one or more complete slices included in a sample of the subpicture track may form a rectangular region. The one or more complete subpictures may be contiguous in the decoding order. The one or more complete slices may be contiguous in the decoding order.

According to an embodiment, a sample of the subpicture track may include one or more complete subpictures, wherein the sample of the subpicture track may not include one or more complete slices. Herein, the one or more complete slices may form part of a subpicture. By excluding the case where a sample of the subpicture track includes only part of the complete subpicture, i.e., the case where a sample of the subpicture track includes a complete slice that forms (or configures) only part of the complete subpicture, the above-described problem may be resolved. In this case, a sample of the subpicture track may be as presented above in Table 11.

Meanwhile, although it is not shown in the drawing, the media file processing apparatus may decode a bitstream based on the subpicture trac and the base track. For example, the media file processing apparatus may decode image information in a bitstream for a subpicture based on the subpicture track and base track and may generate a reconstructed picture based on the image information.

Figure 13:
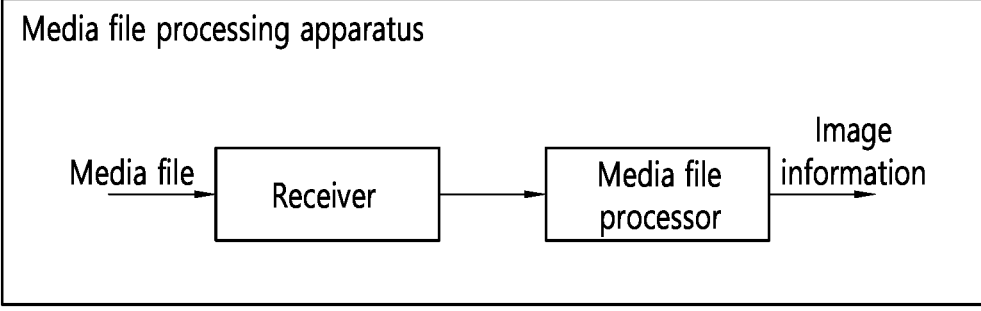
FIG. 13 shows a general view of a apparatus for processing a media file performing a method for processing a media file according to the present disclosure.

FIG. 13 shows a general view of a apparatus for processing a media file performing a method for processing a media file according to the present disclosure. The method disclosed in FIG. 12 may be performed by a apparatus for processing a media file (or media file processing apparatus), which is disclosed in FIG. 13. More specifically, for example, a receiver of the media file processing apparatus of FIG. 13 may perform S1200 of FIG. 12, and a media file processor of the media file processing apparatus of FIG. 13 may perform S1210 and S1220 of FIG. 12. Meanwhile, although it is not shown in the drawing, the media file processing apparatus may include a decoder, and the decoder may decode a bitstream based on a subpicture track and a base track.

According to the above-described embodiment of the present disclosure, a subpicture track may always include one or more complete subpictures. Therefore, this has the effect of preventing the occurrence of the above-described problem, i.e., a case of allowing the subpicture track to include one or more complete slices yet not including all of the slices within one subpicture. Additionally, in case of applying the present embodiment, it may be advantageous in that a relationship between a VVC subpicture track, a VVC subpicture, and slices within the VVC subpicture may become simple and clear.

According to the above-described other embodiment of the present disclosure, in case the subpicture track includes one or more complete slices but does not include all slices in one picture, by limiting the configuration so that all of the slices in the subpicture track belong to the same subpicture, and so that all VVC base tracks referencing the subpicture track also reference subpicture track(s) including the remaining slices of the same subpicture, this has an advantageous effect of resolving the above-described problem. That is, even though the subpicture track included slices, in case the slices are not all included in one subpicture, this may have an advantageous effect of preventing a case where the slices are not always referenced by the same VVC base track, which also references other subpicture tracks including remaining slices of the same subpicture, which then results in the track becoming useless. Additionally, in case of applying the present embodiment, it may be advantageous in that a relationship between a VVC subpicture track, a VVC subpicture, and slices within the VVC subpicture may become simple and clear.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The embodiments described in the present document may be embodied and performed on a processor, a microprocessor, a controller or a chip. For example, function parts shown in each drawing may be embodied and performed on a computer, a processor, a microprocessor, a controller or a chip. In this case, information for implementation (ex. information on instructions) or an algorithm may be stored in a digital storage medium.

Furthermore, the apparatus to which this document is applied may be included in a multimedia broadcasting transmission and reception apparatus, a mobile communication terminal, a home cinema video apparatus, a digital cinema video apparatus, a camera for monitoring, a video dialogue apparatus, a real-time communication apparatus such as video communication, a mobile streaming apparatus, a storage medium, a camcorder, a video on-demand (VoD)

service provision apparatus, an over the top (OTT) video apparatus, an Internet streaming service provision apparatus, a three-dimensional (3D) video apparatus, a video telephony apparatus, transportation means terminal (e.g., a vehicle terminal, an aircraft terminal, and a vessel terminal), and a medical video apparatus, and may be used to process a video signal or a data signal. For example, the over the top (OTT) video apparatus may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage apparatus s in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage apparatus, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 14:
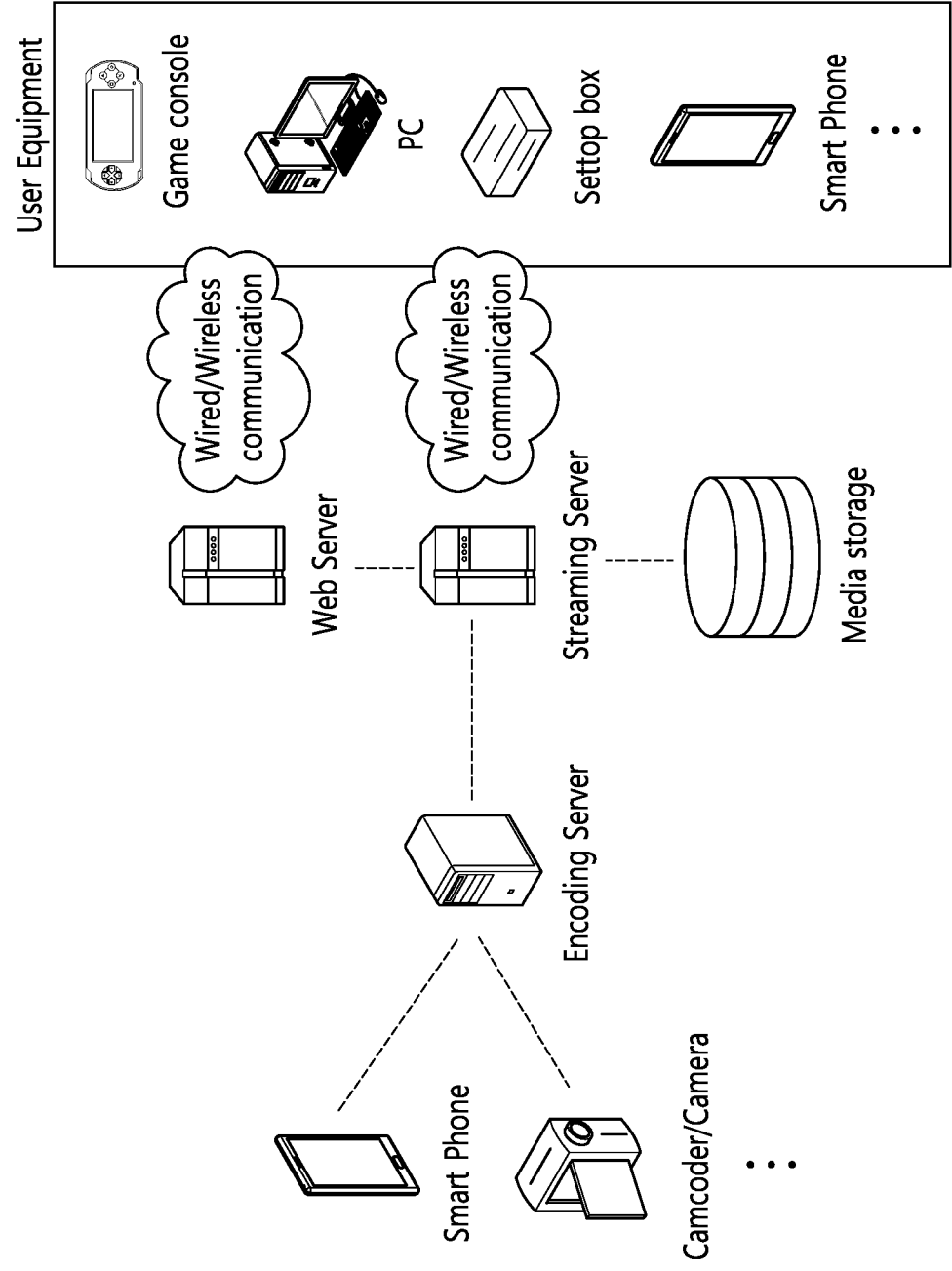
FIG. 14 illustrates an exemplary structural diagram of a content streaming system to which embodiments disclosed in the present document are applied.

FIG. 14 illustrates an example of a content streaming system to which embodiments disclosed in this document may be applied.

The content streaming system to which the embodiments of the present document are applied may basically include an encoding server, a streaming server, a web server, a media storage, a user apparatus, and a multimedia input apparatus.

The encoding server compresses content input from multimedia input apparatus such as a smartphone, a camera, a camcorder, etc. into digital data to generate a bitstream and transmit the bitstream to the streaming server. As another example, when the multimedia input apparatus such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user apparatus based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between apparatus in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user apparatus may include a mobile phone, a smartphone, a laptop computer, a digital broadcasting terminal, a personal digital assistant (PDA), a portable multimedia player (PMP), navigation, a slate PC, tablet PCs, ultrabooks, wearable apparatus (ex. smartwatches, smart glasses, head mounted displays), digital TVs, desktops computer, digital signage, and the like. Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. A method for a media file generating, the method comprising:
   configuring subpicture tracks, wherein each of the subpicture tracks includes one of one or more subpictures or one or more slices;
   configuring a base track which references at least one subpicture track; and
   generating a media file comprising the subpicture tracks and the base track;
   wherein the subpicture tracks include a first subpicture track and one or more second subpicture tracks,
   wherein based on a case that the first subpicture track includes the one or more slices that are not equal to all slices of a subpicture,
   all slices in the first subpicture track belong to the same subpicture, and
   the base track referencing the first subpicture track also references the one or more second subpicture tracks that contain the rest of slices of the same subpicture.

2. The method of claim 1, wherein the subpicture includes one or more first slices and one or more second slices,
   wherein the one or more second slices are remaining slices of the subpicture excluding the one or more first slices,
   wherein based on a case that the first subpicture track includes the one or more first slices,
   all slices in the first subpicture track configure the same subpicture,
   the base track referencing the first subpicture track also references the one or more second subpicture tracks,
   wherein the one or more second subpicture tracks includes the one or more second slices.

3. The method of claim 1, wherein based on a case that the each of the subpicture tracks includes the one or more slices, the one or more slices form a rectangular region.

4. The method of claim 1, wherein the each of the subpicture tracks includes the one or more subpictures other than the one or more slices,
   wherein the one or more slices configure a part of the subpicture.

5. The method of claim 1, wherein a sample of the subpicture tracks includes one of one or more complete subpictures or one or more complete slices.

6. The method of claim 5, wherein based on a case that the sample of the subpicture tracks includes the one or more complete slices, the one or more complete slices form a rectangular region.

7. The method of claim 5, wherein the sample of the subpicture tracks includes the one or more complete subpictures other than the one or more complete slices, wherein the one or more complete slices configure a part of the subpicture.

8. A method for a media file processing, the method comprising:

obtaining a media file comprising subpicture tracks and a base track which references at least one subpicture track, wherein each of the subpicture tracks includes one of one or more subpictures or one or more slices;

parsing the subpicture tracks; and parsing the base track;

wherein the subpicture tracks include a first subpicture track and one or more second subpicture tracks, wherein based on a case that the first subpicture track includes the one or more slices that are not equal to all slices of a subpicture, all slices in the first subpicture track belong to the same subpicture, and the base track referencing the first subpicture track also references the one or more second subpicture tracks that contain the rest of slices of the same subpicture.

9. The method of claim 8, wherein the subpicture includes one or more first slices and one or more second slices, wherein the one or more second slices are remaining slices of the subpicture excluding the one or more first slices, wherein based on a case that the first subpicture track includes the one or more first slices, all slices in the first subpicture track configure the same subpicture, the base track referencing the first subpicture track also references the one or more second subpicture tracks, wherein the one or more second subpicture tracks includes the one or more second slices.

10. The method of claim 8, wherein based on a case that the each of the subpicture tracks includes the one or more slices, the one or more slices form a rectangular region.

11. The method of claim 8, wherein the each of the subpicture tracks includes the one or more subpictures other than the one or more slices, wherein the one or more slices configure a part of the subpicture.

12. The method of claim 8, wherein a sample of the subpicture tracks includes one of one or more complete subpictures or one or more complete slices.

13. The method of claim 12, wherein based on a case that the sample of the subpicture tracks includes the one or more complete slices, the one or more complete slices form a rectangular region.

14. The method of claim 12, wherein the sample of the subpicture tracks includes the one or more complete subpictures other than the one or more complete slices, wherein the one or more complete slices configure a part of the subpicture.

\* \* \* \* \*